United States Patent
Tsuruta

(10) Patent No.: US 11,842,042 B2
(45) Date of Patent: Dec. 12, 2023

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Hirofumi Tsuruta, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/936,938

(22) Filed: Jul. 23, 2020

(65) Prior Publication Data
US 2021/0042001 A1 Feb. 11, 2021

(30) Foreign Application Priority Data
Aug. 8, 2019 (JP) ................. 2019-146640

(51) Int. Cl.
*H04N 1/00* (2006.01)
*G06F 3/04842* (2022.01)
*G06F 3/04845* (2022.01)
*G06F 3/0486* (2013.01)

(52) U.S. Cl.
CPC ........ *G06F 3/0486* (2013.01); *G06F 3/04842* (2013.01); *G06F 3/04845* (2013.01); *H04N 1/00442* (2013.01)

(58) Field of Classification Search
CPC ............... G06F 3/0486; G06F 3/04842; G06F 3/04845; G06F 40/103; G06F 40/106; G06F 40/18; H04N 1/00442
See application file for complete search history.

(56) References Cited

U.S. PATENT DOCUMENTS

| | | | | |
|---|---|---|---|---|
| 5,796,401 A | * | 8/1998 | Winer | G06T 11/60 345/619 |
| 6,144,974 A | * | 11/2000 | Gartland | G06T 11/60 715/205 |
| 2002/0161772 A1 | * | 10/2002 | Bergelson | G06Q 10/10 |
| 2005/0094206 A1 | * | 5/2005 | Tonisson | G06F 40/103 358/1.18 |

(Continued)

FOREIGN PATENT DOCUMENTS

| | | |
|---|---|---|
| JP | 2005340992 A | 12/2005 |
| JP | 2006189989 A | 7/2006 |

(Continued)

*Primary Examiner* — Daniel W Parcher
(74) *Attorney, Agent, or Firm* — Canon U.S.A., Inc. I.P. Division

(57) ABSTRACT

An information processing apparatus to execute object snapping to arrange a new object on a spread page area so that the new object is automatically aligned with another object arranged on the spread page area includes a determination unit and an execution unit. The determination unit determines a snapping point relating to the object snapping based on an arranged object arranged on the spread page area and the spread page area. The execution unit executes the object snapping in a case where the new object to be newly arranged on the spread page area is arranged in a predetermined range based on the snapping point. In a case where the object snapping is executed, the new object to be arranged on the spread page area is arranged at the snapping point by the object snapping.

14 Claims, 20 Drawing Sheets

(56) References Cited

U.S. PATENT DOCUMENTS

| | | | | |
|---|---|---|---|---|
| 2009/0222722 | A1* | 9/2009 | Vaschillo | G06F 40/106 715/245 |
| 2011/0181527 | A1* | 7/2011 | Capela | G06F 3/04845 345/173 |
| 2014/0096012 | A1* | 4/2014 | Grosz | G06F 3/04845 715/733 |
| 2016/0092080 | A1* | 3/2016 | Swanson | G06F 3/04842 345/654 |
| 2017/0337161 | A1* | 11/2017 | Hoford | G06F 30/392 |
| 2018/0004401 | A1* | 1/2018 | Travis | G06F 3/04883 |
| 2018/0032481 | A1* | 2/2018 | Ishida | G06F 3/0485 |
| 2018/0373679 | A1* | 12/2018 | Ranjan | G06F 40/103 |
| 2020/0089397 | A1* | 3/2020 | Chung | G06F 16/24573 |

FOREIGN PATENT DOCUMENTS

| | | |
|---|---|---|
| JP | 2010-176275 A | 8/2010 |
| JP | 2018019330 A | 2/2018 |

* cited by examiner

FIG.6

X-AXIS

| | |
|---|---|
| LEFT MARGIN 1 | ~601 |
| LEFT MARGIN 2 | ~602 |
| BINDING MARGIN (LEFT) | ~603 |
| LEFT-PAGE CENTER | ~604 |
| BINDING POSITION (OR SPINE CENTER) | ~605 |
| RIGHT-PAGE CENTER | ~606 |
| BINDING MARGIN (RIGHT) | ~607 |
| RIGHT MARGIN 1 | ~608 |
| RIGHT MARGIN 2 | ~609 |

Y-AXIS

| | |
|---|---|
| TOP MARGIN 1 | ~610 |
| TOP MARGIN 2 | ~611 |
| PAGE CENTER | ~612 |
| BOTTOM MARGIN 1 | ~613 |
| BOTTOM MARGIN 2 | ~614 |

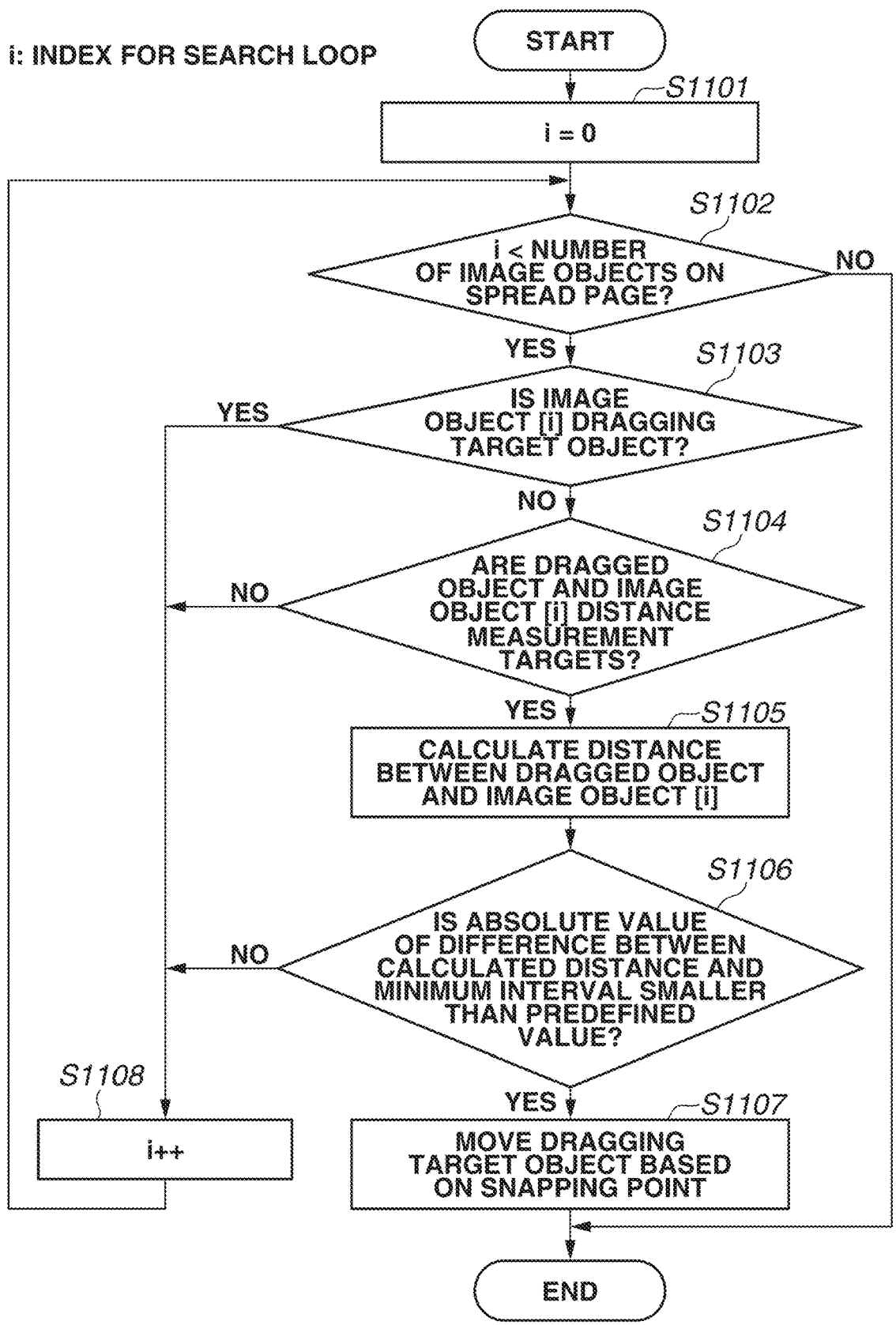

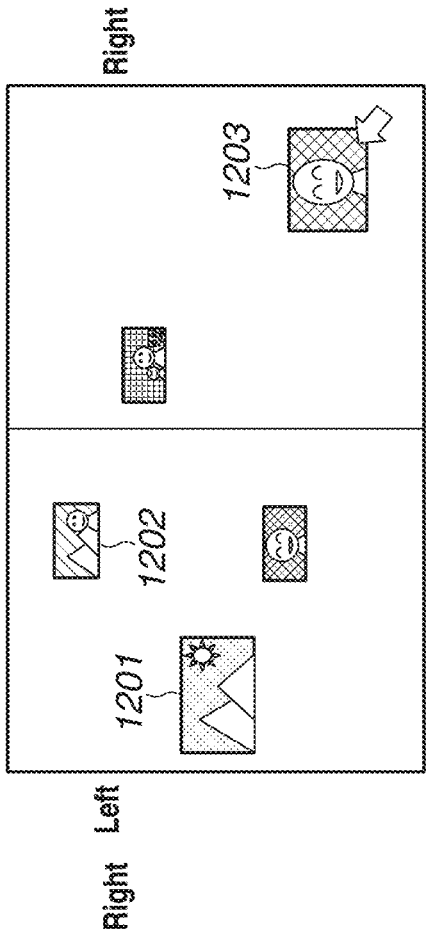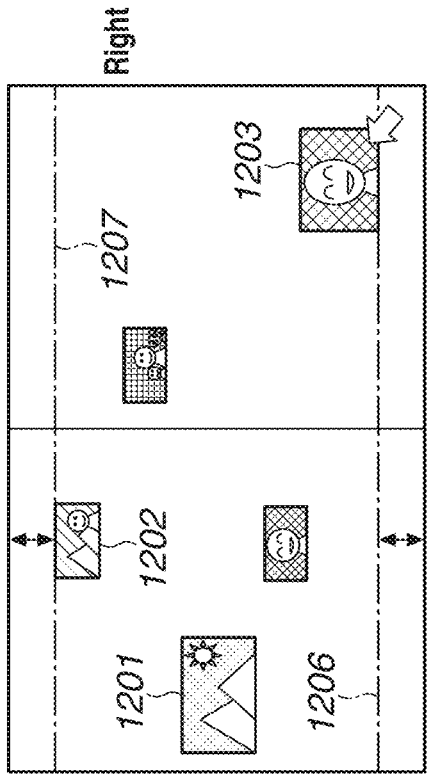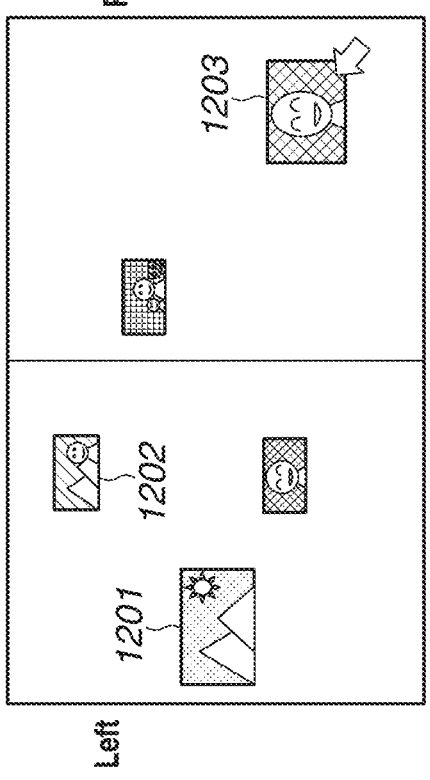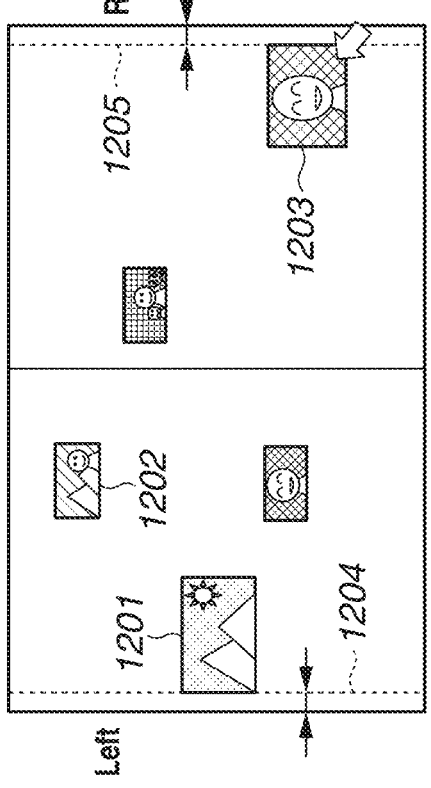

FIG.18A
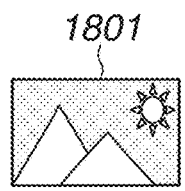
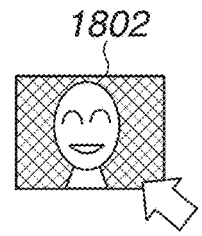
FIG.18B
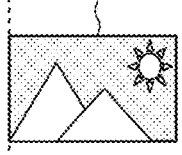
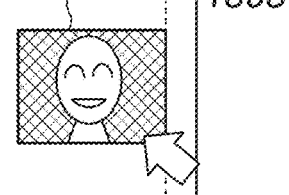

INFORMATION PROCESSING APPARATUS, CONTROL METHOD, AND STORAGE MEDIUM

BACKGROUND

Field

The present disclosure relates to an information processing apparatus, a control method, and a storage medium.

Description of the Related Art

Japanese Patent Application Laid-Open No. 2010-176275 discusses software for creating presentation materials and computer-aided design (CAD) software have a function called object snapping for increasing user operability in object layout processing.

Opportunities to perform layout of objects have been increasing in recent years, and there are demands for more convenient layout operations.

SUMMARY

According to an aspect of the present disclosure, an information processing apparatus to execute object snapping to arrange a new object on a spread page area so that the new object is automatically aligned with another object arranged on the spread page area, includes a determination unit configured to determine a snapping point relating to the object snapping based on an arranged object arranged on the spread page area and the spread page area, and an execution unit configured to execute the object snapping in a case where the new object to be newly arranged on the spread page area is arranged in a predetermined range based on the snapping point, wherein, in a case where the object snapping is executed, the new object to be arranged on the spread page area is arranged at the snapping point by the object snapping.

Further features of the present disclosure will become apparent from the following description of exemplary embodiments with reference to the attached drawings.

BRIEF DESCRIPTION OF THE DRAWINGS

FIG. 6 is a block diagram illustrating an example of snapping points.

FIG. 11 is a flowchart according to the second exemplary embodiment.

FIGS. 12A, 12B, 12C, and 12D are diagrams illustrating an example of object snapping.

FIGS. 18A and 18B are diagrams each illustrating an example of object snapping.

DESCRIPTION OF THE EMBODIMENTS

Figure 7:
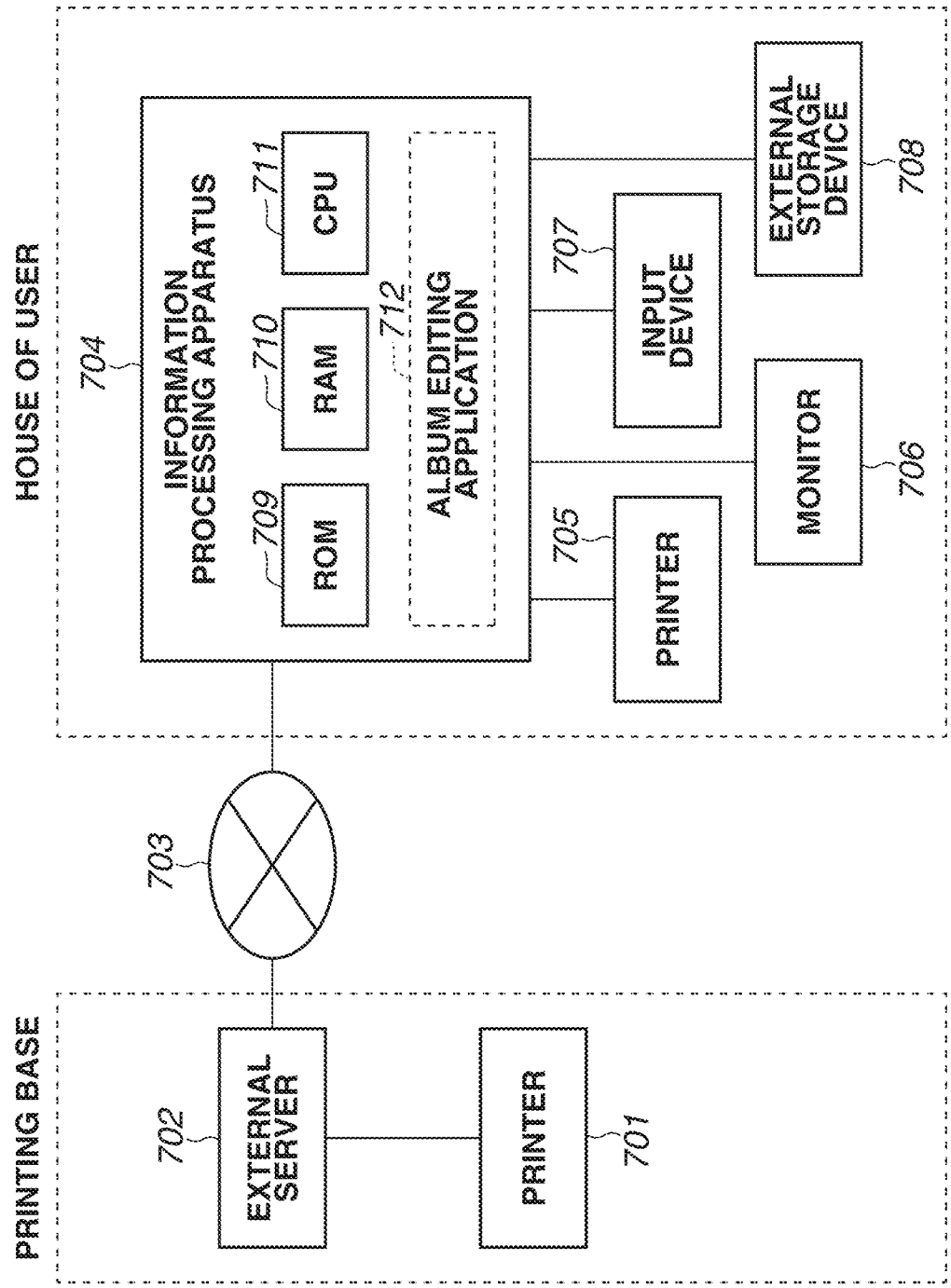
FIG. 7 is a block diagram illustrating a system configuration.

FIG. 7 is a diagram illustrating a configuration of a photo album ordering system. An information processing apparatus 704 transmits a request to generate a photo album to a printing base via a network 703. The printing base includes a printer 701. The information processing apparatus 704 is, for example, a personal computer (PC), tablet, or smartphone.

Figure 19:
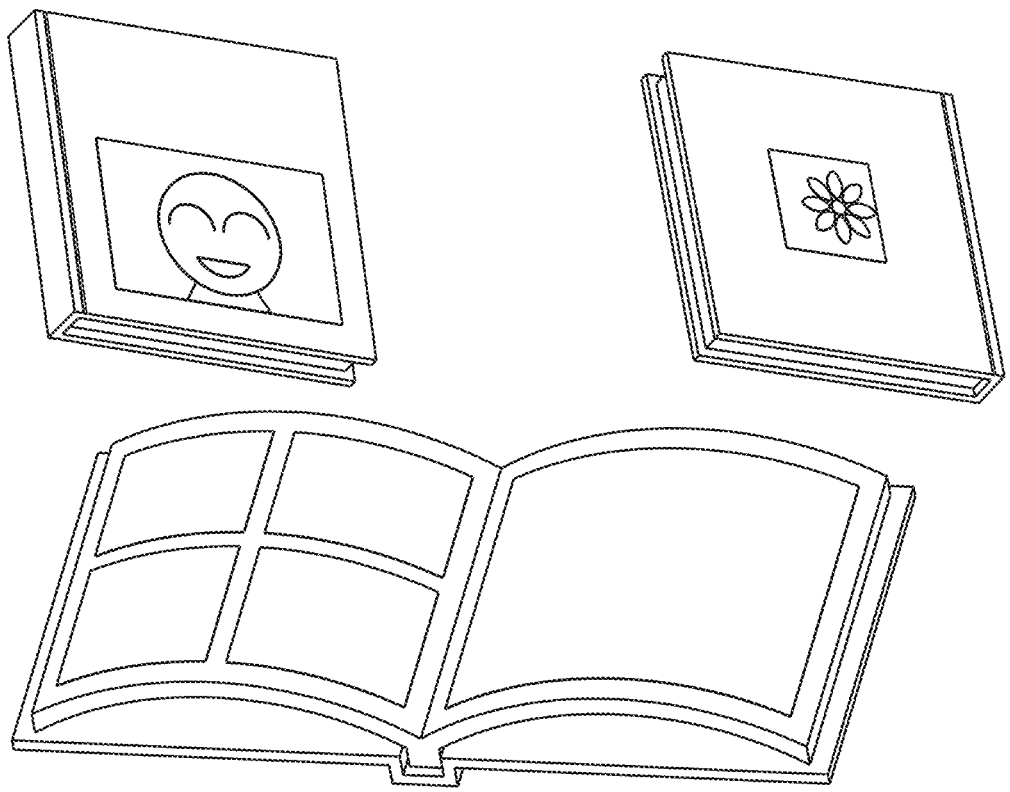
FIG. 19 is a diagram illustrating an example of a photo album.

An album editing application 712 is installed in the information processing apparatus 704. The album editing application 712 is configured to generate album data for generating an album (photo album, photo book) as illustrated in FIG. 19 from image data. The information processing apparatus 704 transmits print data based on album data to a printer 705. The information processing apparatus 704 can upload album data to an external server 702. The information processing apparatus 704 includes a read-only memory (ROM) 709, a random access memory (RAM) 710, and a central processing unit (CPU) 711. Further, the printer 705, a monitor 706, an input device 707, and an external storage device 708 are connected to the information processing apparatus 704. The information processing apparatus 704 further includes an input/output interface (not illustrated) for connecting to the network 703.

The CPU 711 controls the entire information processing apparatus 704 by executing an operating system (OS) stored on a storage device 708, the ROM 709, or the RAM 710. Programs are stored on the ROM 709. The RAM 710 is used as a work memory of the CPU 711. In a case where the RAM 710 is a non-volatile RAM, programs are stored on the RAM 710.

The information processing apparatus 704 can communicate with the external server 702 via the network 703. The external server 702 includes an input/output interface (not illustrated) for connecting to the printer 701 and can communicate with the printer 701 via the input/output interface.

Album data generated by the information processing apparatus 704 is uploaded to the external server 702 via the network 703. The external server 702 transmits print data based on the uploaded album data to the printer 701. For example, the external server 702 receives an order for an album and manages the received order.

A user uploads album data generated by the information processing apparatus 704 to the external server 702 and performs necessary operations to purchase an album. In a case where the user operations are performed appropriately, the external server 702 transmits print data based on the album data to the printer 701. Then, printed materials printed by the printer 701 are bound to generate an album, and the album is delivered to the user.

The printer 705 prints print data based on the album data generated by the information processing apparatus 704. For example, printed materials printed by the printer 705 are bound by the user to generate an album. The monitor 706 is a display device that displays image information and the album data that are output from the information processing apparatus 704. The input device 707 is an input device, such as a keyboard and pointing device, for inputting information to the information processing apparatus 704. In one form of an input device, the input device 707 is integrated with a monitor to form a touch panel, and the monitor is directly touched to input information. The storage device 708 is a storage device, such as a hard disk drive (HDD) or solid state drive (SSD), for storing image data and templates. The configuration illustrated in FIG. 7 is a mere example, and any other configurations can be employed. For example, the information processing apparatus 704 may include the monitor 706, the input device 707, and the storage device 708.

Next, a process of ordering a photo book by a user using the system illustrated in FIG. 7 will be described. If the album editing application 712 is activated, the user can generate new album data or re-edit album data. In a case where re-editing is to be performed, for example, album data is acquired by the information processing apparatus 704 via the network 703. Alternatively, album data may be retrieved into the information processing apparatus 704 via the external storage device 708. In a first exemplary embodiment, a process of generating new album data will be described below.

Figure 16A:
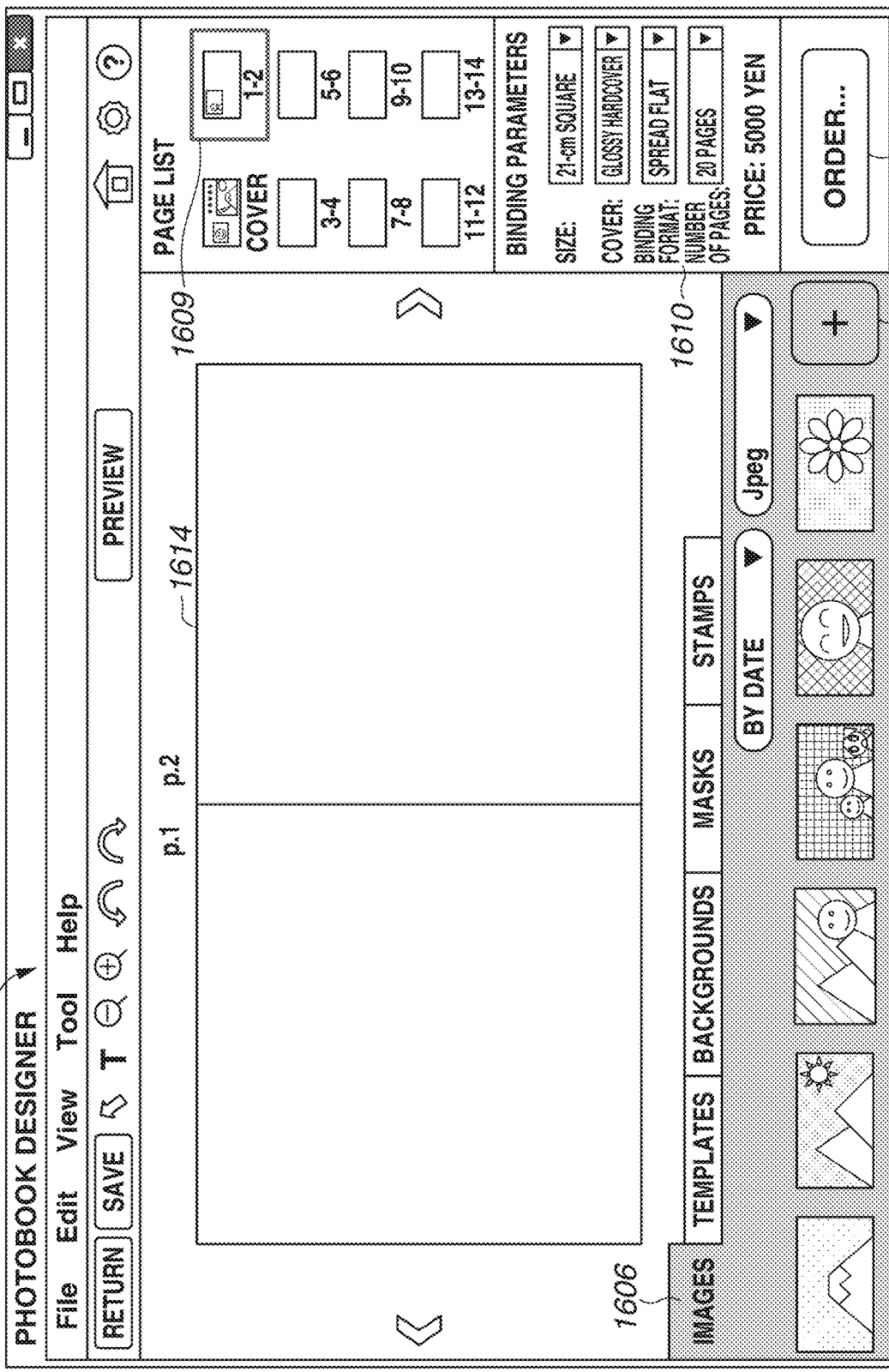
FIGS. 16A and 16B are diagrams each illustrating an example of an editing screen.

In a case where new album data is to be generated, an editing screen 1601 illustrated in FIG. 16A is displayed. In an initial state of the editing screen 1601 in FIG. 16A, items other than a binding parameter setting area 1610 are all grayed-out (non-enterable state).

The user selects an album size (e.g., 21 cm square and A4), a cover type (e.g., hardcover and softcover), and the number of pages (e.g., 20 pages and 30 pages) as binding parameters. The setting items can include other items such as a sheet type. If parameters are input to all the setting items, a price of the album is calculated, and the calculated price is displayed.

If the calculated price is displayed, a page list area 1609 becomes no longer grayed-out, and a list of spread pages based on the designated binding parameters is displayed.

If the user selects a spread page to be edited from the page list area 1609, a page image of a spread page 1614 is displayed to change to an editing waiting state. If a read button 1612 is pressed to read image data for generating the album, a file selection dialog is displayed. The user selects image data using the file selection dialog.

Figure 16B:
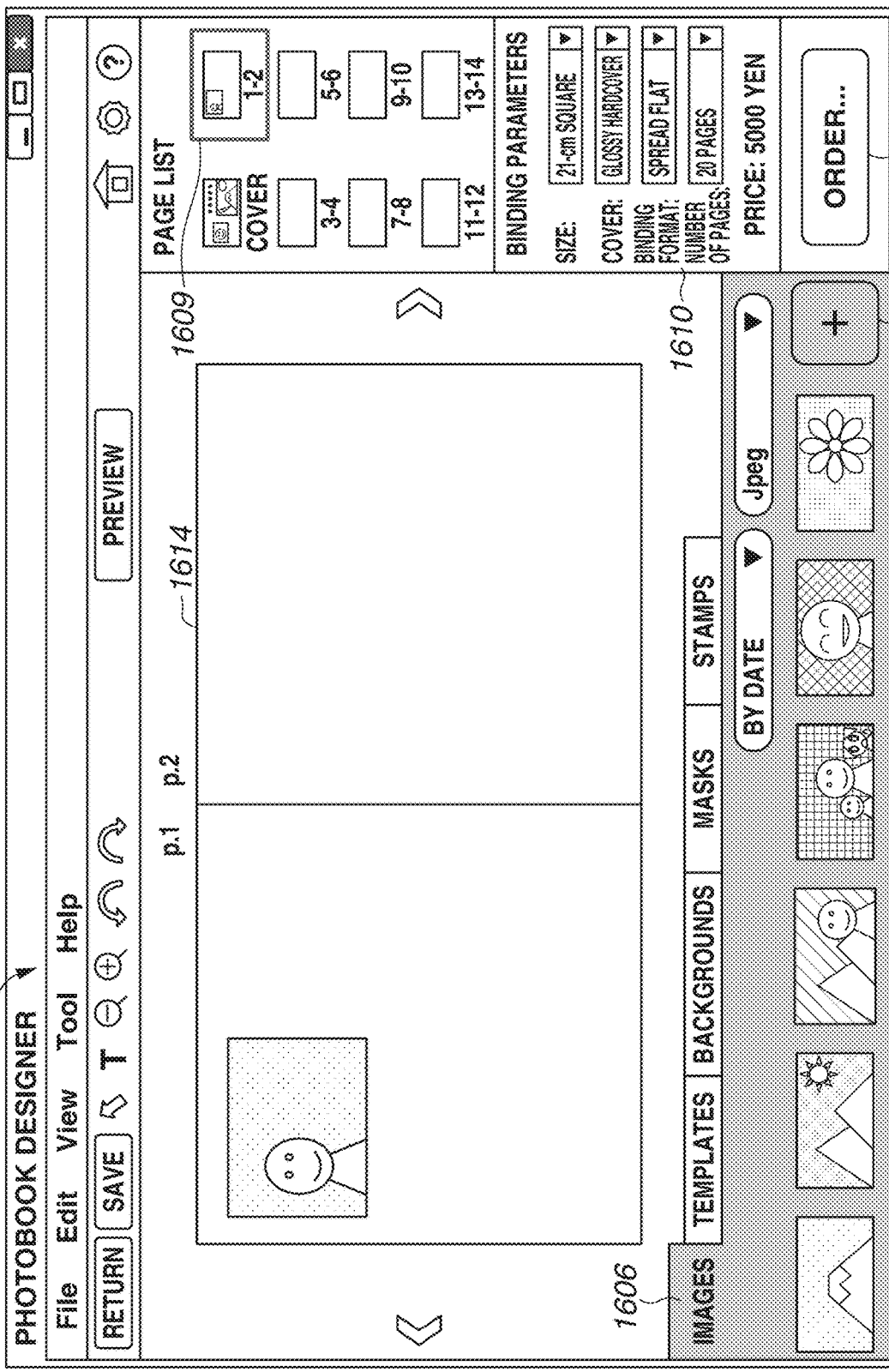

The pieces of selected image data are displayed on a list 1606, and the user drags desired image data and drops the dragged image data onto a spread page 1614, As a result, the image data is arranged on the spread page 1614 (FIG. 16B).

In a case where the user orders the album, album data generated by the information processing apparatus 704 is uploaded to the external server 702 via the network 703. If the uploaded album data is printable, the external server 702 outputs print data based on the uploaded album data to the printer 701.

The present exemplary embodiment is a function that assists a user in manually arranging image data to generate an album, and this functions in a layout editing operation that uses the editing screen 1601 illustrated in FIGS. 16A and 16B. In the present exemplary embodiment, the upper left corner of a spread page is the origin, and the X-coordinate value increases toward the right whereas Y-coordinate value increases toward the bottom (e.g., coordinate value 1003 in FIG. 10).

The user selects a page to be edited from the page list area 1609 in FIG. 16A and drags image data selected from the list 1606 of images displayed at the bottom and drops the dragged image data onto the spread page 1614. As a result, the image data is added to the spread page 1614 as illustrated in FIG. 16B. The user further drags or moves the added image (image data) using the mouse or the touch panel to adjust the position and size of the image data. The information processing apparatus 704 according to the present exemplary embodiment is configured to perform object snapping to increase efficiency in such layout operations by a user. The object snapping is processing of automatically determining a position to arrange a new object based on the positions of other arranged objects. By the object snapping, a user can adjust the positional relationship between an arranged object and a new object with ease when arranging the new object. Specific operations will be described below with reference to, for example, FIGS. 18A and 18B.

Figure 1:
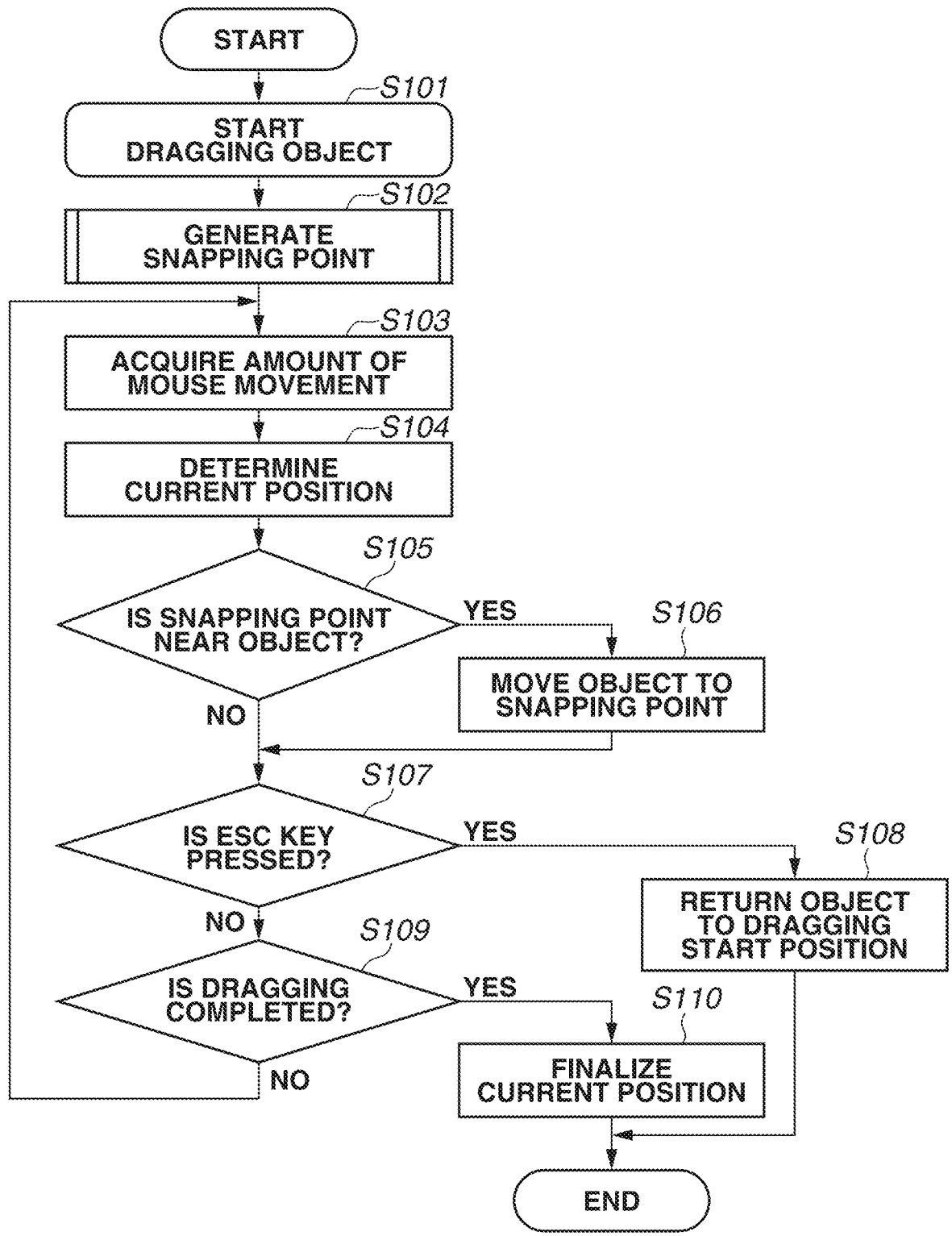
FIG. 1 is a flowchart according to a first exemplary embodiment.

Next, a process according to the present exemplary embodiment will be described with reference to FIG. 1. A flowchart according to the present exemplary embodiment is realized by the CPU 711 reading a program relating to a process illustrated in the flowchart from a memory and executing the read program.

Figure 5:
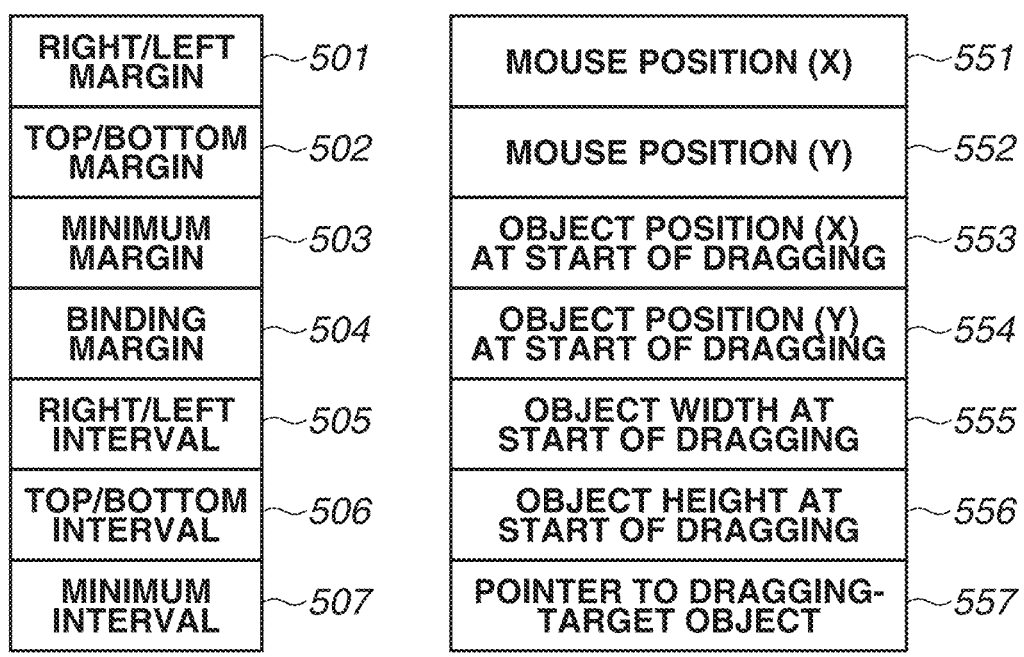
FIG. 5 is a block diagram illustrating an example of a buffer.

In step S101, the CPU 711 receives a user operation of dragging an object arranged on a spread page. In a case where a drag operation is received, the CPU 711 searches for an object at the mouse position and stores position information and size information about the dragging target object in information 553 to information 556 in drag start information buffer in a in FIG. 5. In FIG. 5, information 501 to information 507 are stored in an interval storage buffer, and information 551 to information 557 are stored in the drag start information buffer.

For example, the X- and the Y-coordinate of the upper left vertex of the dragging target image data are respectively stored in the information 553 and the information 554. Further, the width and height of the dragging target image data are respectively stored in the information 555 and the information 556. To move the dragging target object or change the size of the dragging target object after the dragging target object is dragged, the CPU 711 needs to or should access the dragging target object. Thus, the CPU 711 stores a pointer to the dragging target object as the information 557. Further, the CPU 711 stores the mouse position at the time of the start of the dragging in the information 551 and the information 552 (mouse positions) in the drag start information buffer in FIG. 5.

In step S102, the CPU 711 generates a snapping point on a buffer illustrated in FIG. 6. Details of step S102 will be described below.

In step S103, the CPU 711 calculates the difference between the information 551 and the information 552 in FIG. 5 and the current mouse position, and acquires an amount of mouse movement.

In step S104, the CPU 711 determines position information about the current position of the dragging target object. Specifically, the CPU 711 calculates the current position of the dragging target object based on the amount of mouse movement acquired in step S103 and the information 553 and the information 554 in FIG. 5. Then, the CPU 711 reflects the position information about the calculated current position of the dragging target object in position information 801 specified by the pointer stored in the information 557 to the dragging target object.

In step S105, the CPU 711 determines whether the snapping point is near the current position of the dragging target object. Specifically, the CPU 711 compares the snapping point data illustrated in FIG. 6 and the position information about the current position of the dragging target object that is determined in step S104, and determines whether the distance between the snapping point and the current position is smaller than a predefined distance. In a case where the CPU 711 determines that the snapping point is near the current position (YES in step S105), the processing proceeds to step S106. In step S106, the CPU 711 moves the dragging target object to the nearby snapping point. In other words, the CPU 711 performs object snapping in a case where a new object is arranged in a predetermined range based on the snapping point. Now, details of step S105 will be described.

Figure 8:
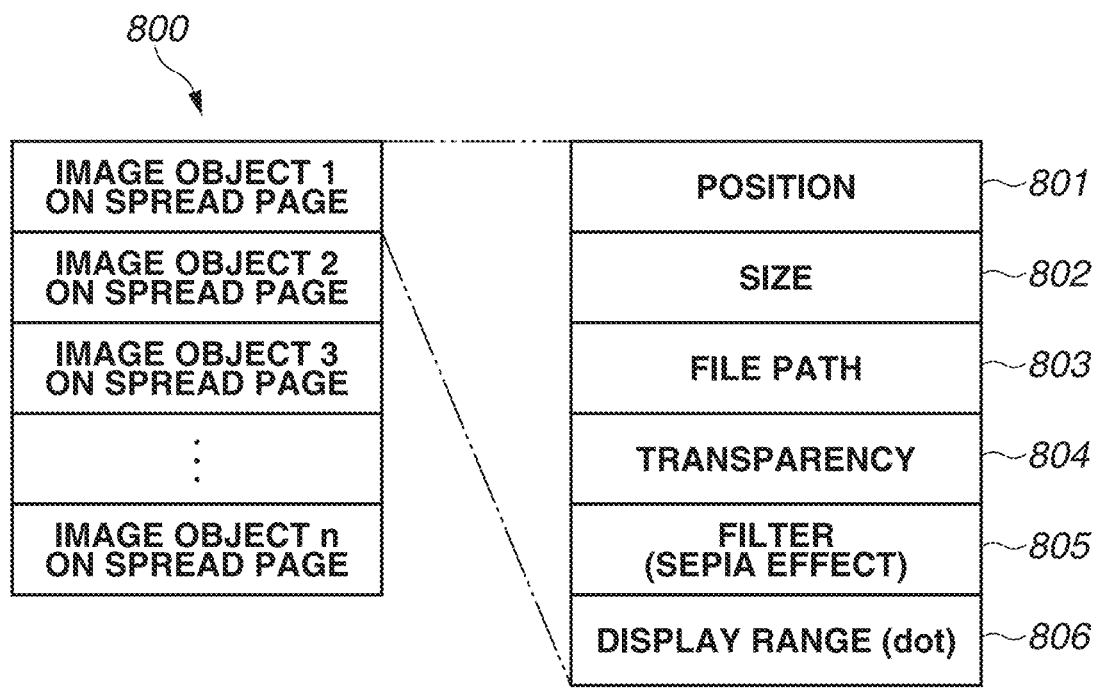
FIG. 8 is a block diagram illustrating an example of an object list.

Information about the position and size of image data arranged on a spread page is managed as illustrated in FIG. 8. Thus, the CPU 711 compares the X-coordinate specified by the position information 801 about the dragging target object and a left margin 1 (601) of the snapping point data in FIG. 6 and determines whether the distance between the X-coordinate and the left margin 1 (601) is smaller than a predefined distance. In a case where the CPU 711 determines that the distance between the X-coordinate and the left margin 1 (601) is smaller than the predefined distance, the CPU 711 moves the dragging target object to the position of the left margin 1 (601).

On the other hand, in a case where the CPU 711 determines that the distance between the X-coordinate specified by the position information 801 about the dragging target object and the left margin 1 (601) of the snapping point data in FIG. 6 is greater than the predefined distance, the CPU 711 changes the comparison target to a left margin 2 (602) and performs similar comparison processing using the left margin 2 (602).

Next, comparisons between the X-coordinate specified by the position information 801 about the dragging target object and each one of a binding margin (left) 603 to a tight-page center 606 will be described below.

First, the CPU 711 calculates the X-coordinate of a center of the dragging target object by calculating "(X-coordinate specified by the position information 801 about the object)+ (width specified by size information 802)/2". The CPU 711 compares the calculated X-coordinate and each one of the binding margin (left) 603 to the right-page center 606. In a case where the CPU 711 determines that the distance between the X-coordinate of the center of the dragging target object and any one of the binding margin (left) 603 to the right-page center 606 is smaller than a predefined distance, the CPU 711 moves the dragging target object using the comparison target snapping point data.

In a case where the CPU 711 still determines that the snapping point is not near the current position of the dragging target object as a result of the comparison between the right-page center 606 and the X-coordinate of the center of the dragging target object, the CPU 711 changes the next comparison target snapping point data to a binding margin (right) 607 and subsequent data.

First, the CPU 711 calculates the X-coordinate of a right edge of the dragging target object by calculating "(X-coordinate specified by the position information 801 about the object)+(width specified by the size information 802)". The CPU 711 compares the calculated X-coordinate and each one of the binding margin (right) 607 to a right margin

2 (609). In a case where the CPU 711 determines that the distance between the X-coordinate of the center of the dragging target object and any one of the binding margin (right) 607 to the right margin 2 (609) is smaller than a predefined distance, the CPU 711 moves the dragging target object using the comparison target snapping point data.

In a case where the CPU 711 still determines that the snapping point is not near the current position of the dragging target object as a result of the comparison between the right margin 2 (609) and the X-coordinate of the center of the dragging target object, the CPU 711 changes the comparison target to a top margin 1 (610). The CPU 711 compares the Y-coordinate specified by the position information 801 about the dragging target object and each one of the top margin 1 (601) and a top margin 2 (602). In a case where the CPU 711 determines that the distance between the Y-coordinate of the dragging target object and the top margin 1 (601) or the top margin 2 (602) is smaller than a predefined distance, the CPU 711 moves the dragging target object using the comparison target snapping point data.

In a case where the CPU 711 still determines that the snapping point is not near the current position of the dragging target object as a result of the comparison between the top margin 2 (602) and the Y-coordinate of the dragging target object, the CPU 711 changes the next comparison target snapping point data to a page center (612).

First, the CPU 711 calculates the Y-coordinate of the center of the dragging target object by calculating "(Y-coordinate specified by the position information 801 about the object)+(height specified by the size information 802)/ 2". The CPU 711 compares the calculated Y-coordinate and the page center (612). In a case where the CPU 711 determines that the distance between the Y-coordinate of the center of the dragging target object and the page center (612) is smaller than a predefined distance, the CPU 711 moves the dragging target object using the comparison target snapping point data.

In a case where the CPU 711 still determines that the snapping point is not near the current position of the dragging target object as a result of the comparison between the Y-coordinate of the center of the dragging target object and the page center (612), the CPU 711 changes the next comparison target snapping point data to a bottom margin 1 (613).

First, the CPU 711 calculates the Y-coordinate of a bottom edge of the dragging target object by calculating "(Y-coordinate specified by the position information 801 about the object)+(height specified by the size information 802)". The CPU 711 compares the calculated Y-coordinate and each one of the bottom margin 1 (613) and a bottom margin 2 (614). In a case where the CPU 711 determines that the distance between the Y-coordinate of the bottom edge of the dragging target object and the bottom margin 1 (613) or the bottom margin 2 (614) is smaller than a predefined distance, the CPU 711 moves the dragging target object using the comparison target snapping point data.

In a case where the CPU 711 still determines that the snapping point is not near the current position of the dragging target object as a result of the comparison of the distance between the Y-coordinate of the bottom edge of the dragging target object and the bottom margin 2 (614), the CPU 711 determines that the snapping point is not near the current position of the dragging target object (NO in step S105).

On the other hand, in a case where the CPU 711 determines that the snapping point is near the current position of the dragging target object (YES in step S105), the processing proceeds to step S106. In step S106, the CPU 711 moves (snaps) the position of the dragging target object to the snapping point.

Details of step S106 will be described now. For example, in a case where the CPU 711 determines that the snapping point is near the current position of the dragging target object (YES in step S105) when one of the left margin 1 (601) to the binding margin (left) 603 is used as a comparison target, the CPU 711 reflects the comparison target data in the X-coordinate of the dragging target object. This processing enables the CPU 711 to move the left edge of the dragging target object to the comparison target snapping point.

A case where, for example, the CPU 711 determines that the snapping point is near the current position of the dragging target object (YES in step S105) when one of the left-page center (604) to the right-page center (606) is used as a comparison target will be described. In this case, the CPU 711 reflects "(matched snapping point)–(width specified by the size information 802)/2" in the X-coordinate of the dragging target object. This processing enables the CPU 711 to move the center of the dragging target object to the comparison target snapping point.

A case where, for example, the CPU 711 determines that the snapping point is near the current position of the dragging target object (YES in step S105) when one of the binding margin (right) 607 to the right margin 2 (609) is used as a comparison target will be described. In this case, the CPU 711 reflects "(matched snapping point)–(width specified by the size information 802)" in the X-coordinate of the dragging target object. This processing enables the CPU 711 to move the right edge of the dragging target object to the comparison target snapping point.

A case where, for example, the CPU 711 determines that the snapping point is near the current position of the dragging target object (YES in step S105) when the top margin 1 (610) or the top margin 2 (611) is used as a comparison target will be described. In this case, the CPU 711 moves the top edge of the dragging target object to the comparison target snapping point.

A case where, for example, the CPU 711 determines that the snapping point is near the current position of the dragging target object (YES in step S105) when the page center 612 is used as a comparison target will be described. In this case, the CPU 711 reflects "(matched snapping point)–(height specified by the size information 802)/2" in the Y-coordinate of the dragging target object. This processing enables the CPU 711 to move the center of the dragging target object to the comparison target snapping point.

A case where the CPU 711 determines that the snapping point is near the current position of the dragging target object (YES in step S105) when the bottom margin 1 (613) or the bottom margin 2 (614) is used as a comparison target will be described. In this case, the CPU 711 reflects a value obtained by subtracting the object height from the value of the bottom margin 1 (613) or the bottom margin 2 (614) in the Y-coordinate of the object. This processing enables the CPU 711 to move the bottom edge of the dragging target object to the comparison target snapping point.

Alternatively, the CPU 711 may display a guideline at a position that is used as a reference in the processing in step S106, The object snapping and guideline display processing will be described with reference to FIGS. 18A and 18B.

In FIG. 18A, new image data 1802 is dragged in a situation where image data 1801 is arranged at a position at a distance 1803 from a left edge of a spread page. In other words, the image data 1802 is a dragging target object. A value that indicates the distance 1803 is stored in the left margin 1 (601) and the right margin 1 (608) in FIG. 6. In this situation, if the image data 1802 is dragged from the right edge of the spread page to a position located at the distance 1803 from the right edge, the CPU 711 determines that the snapping point is near the current position of the dragging target object (YES in step S105), and step S106 is executed. As a result, the CPU 711 moves the image data 1802 to the snapping point located at the distance 1803 from the right edge of the spread page to as illustrated in FIG. 18B. The movement from the image data 1802 in FIG. 18A to the image data 1802 in FIG. 18B is automatically performed. In this case, the CPU 711 displays a guideline 1804 and an arrow 1803 with respect to the snapping point used as a reference for snapping. Alternatively, the guideline 1804 and the arrow used to indicate the distance 1803 may be displayed in any other forms.

In step S107, the CPU 711 determines whether an operation to cancel the drag operation is performed. In a case where, for example, an ESC key is operated, the CPU 711 determines that an operation to cancel the drag operation is performed. In a case where the CPU 711 determines that an operation to cancel the drag operation is not performed (NO in step S107), the processing proceeds to step S109.

On the other hand, in a case where the CPU 711 determines that an operation to cancel the drag operation is performed (YES in step S107), the processing proceeds to step S108. In step S108, the CPU 711 acquires the object positions stored in the information 553 and the information 554 and the object sizes stored in the information 555 and the information 556 at the time of the start of the dragging from the drag start information buffer in FIG. 5. Then, the CPU 711 returns the dragging target object to the state before the dragging by reflecting the object positions in the information 553 and the information 554 and the object sizes in the information 555 and the information 556 in the position information (801) and the size information (802) about the dragging target object specified by the pointer stored in the information 557 to the dragging target object.

In step S109, the CPU 711 determines whether the drag operation is completed. Specifically, the CPU 711 realizes step S109 by checking whether the user releases the mouse button. In a case where the CPU 711 determines that the drag operation is completed (YES in step S109), the processing proceeds to step S110. In step S110, the CPU 711 finalizes the current position information as the position of the dragging target object. On the other hand, in a case where the CPU 711 determines that the drag operation is not completed (NO in step S109), the processing in FIG. 1 returns to step S103.

Next, prior to detailed descriptions about step S102, the snapping point will be described with reference to FIG. 17.

Figure 17:
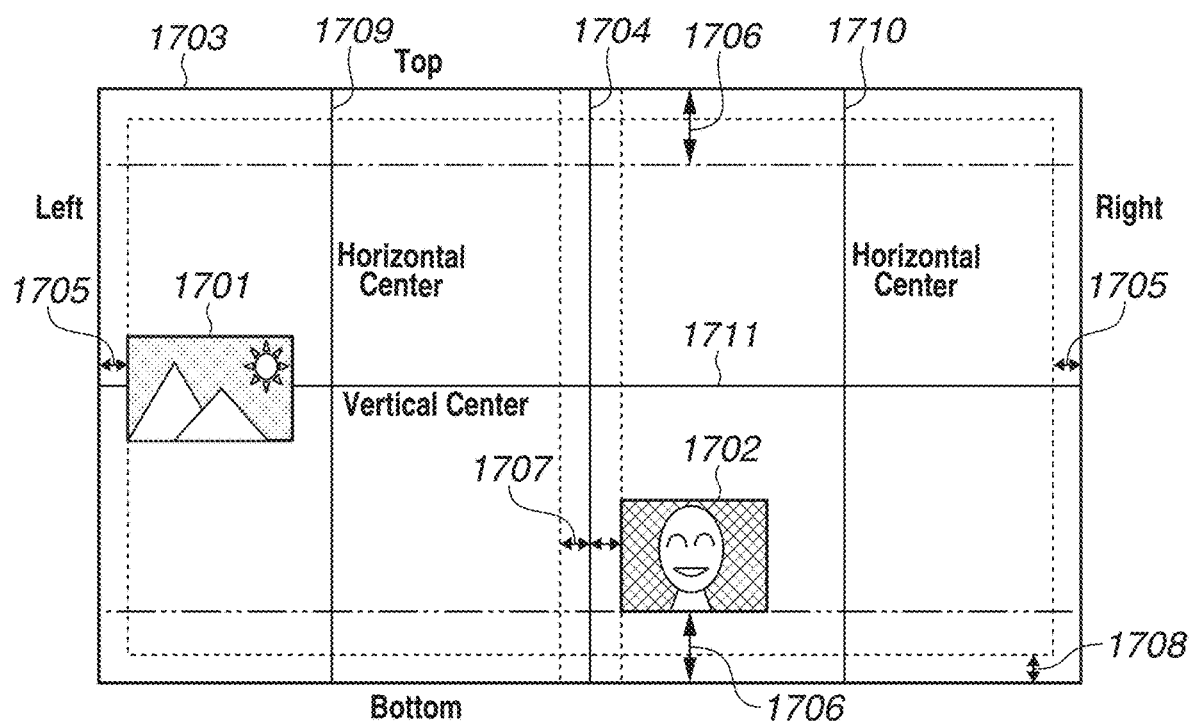
FIG. 17 is a diagram illustrating an example of a snapping point.

FIG. 17 illustrates a state where image data 1701 and image data 1702 are arranged on a spread page 1703.

The first snapping point is a right/left margin. In FIG. 17, the image data 1701 and the image data 1702 are arranged on the spread page 1703, and the image data 1701 is the image data that is arranged at the smallest distance from a right/left edge. Thus, a vertical line at a distance 1705, which is the distance between the left edge and the image data 1701, from the left edge and a vertical line at the distance 1705 from the right edge are the snapping point of the right/left margin.

The second snapping point is a top/bottom margin. In FIG. 17, the image data 1702 is the image data that is arranged at the smallest distance from a top/bottom edge of the spread page 1703. Thus, a horizontal line at a distance 1706, which is the distance between the bottom edge of the spread page 1703 and the image data 1702, from the bottom edge and a horizontal line at the distance 1706 from the top edge are the snapping point of the top/bottom margin.

The third snapping point is a minimum margin. In FIG. 1, the distance 1705 between the left edge of the spread page 1703 and the image data 1701 is smaller than the distance 1706 between the bottom edge of the spread page 1703 and the image data 1702. Thus, vertical lines at the distance 1705 from the tight/left edges and horizontal lines at the distance 1705 from the top/bottom edges are the snapping point of the minimum margin.

The fourth snapping point is a binding margin. In FIG. 17, a distance 1707 between the image data 1702 and a binding portion 1704 is smaller than the distance between the image data 1701 and the binding portion 1704. Thus, a vertical line at the distance 1707 to the right from the binding portion 1704 and a vertical line at the distance 1707 to the left from the binding portion 1704 are the snapping point of the binding margin. In a case where new image data is dragged over the binding portion 1704, the CPU 711 can disable the snapping processing.

Figure 2:
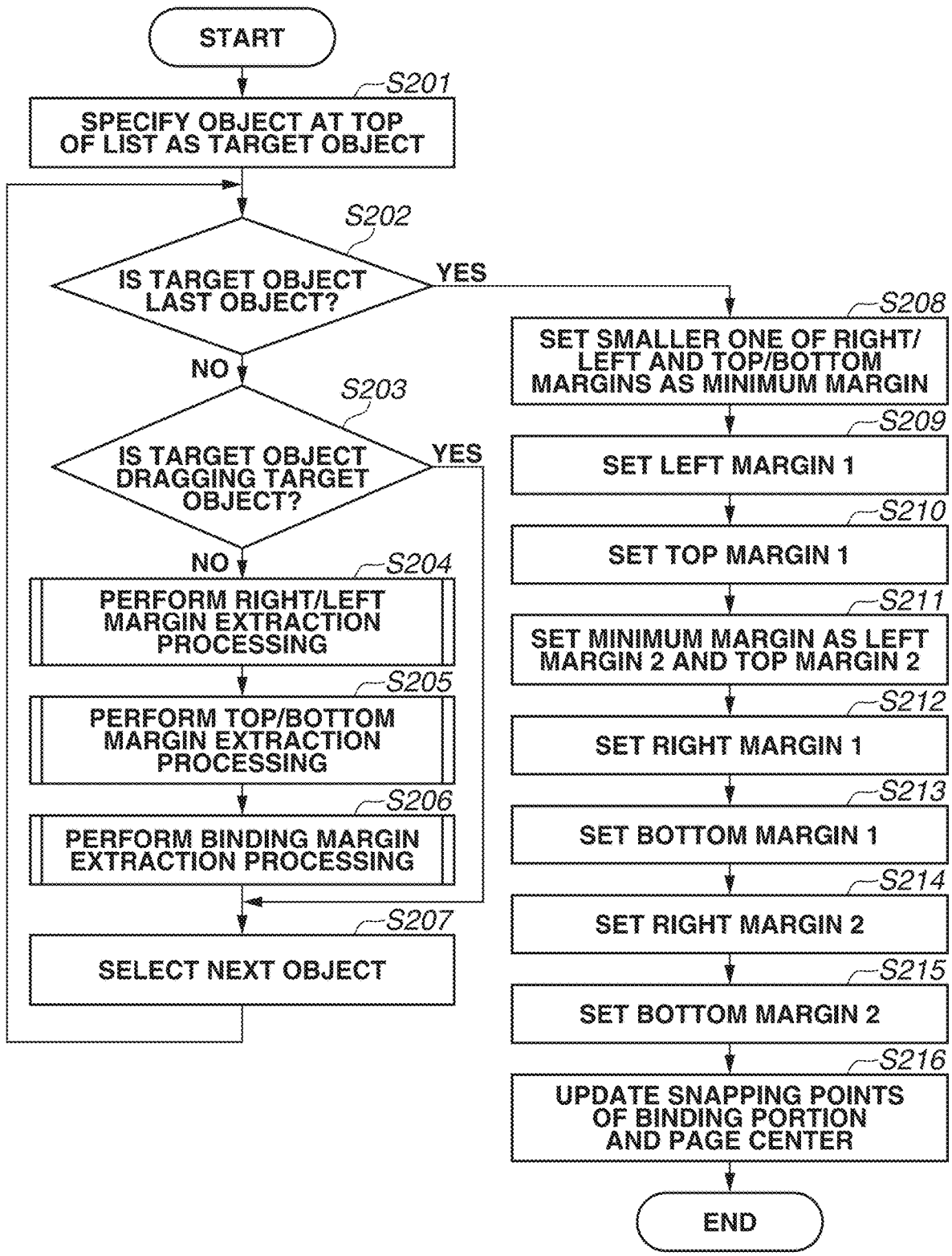
FIG. 2 is a flowchart according to the first exemplary embodiment.

Next, a process of generating a snapping point will be described with reference to FIG. 2.

In step S201, the CPU 711 generates an object list 800 illustrated in FIG. 8 based on objects arranged on a spread page and specify the object at the top of the object list 800 as a target object. At this time, the CPU 711 secures an area of the interval storage buffer illustrated in FIG. 5 in the RAM 710 and performs initialization. More specifically, the CPU 711 sets a value of "sheet width/4" to the right/left margin stored in the information 501 and the binding margin stored in the information 504 and sets a value of "sheet height/2" to the top/bottom margin in the information 502.

In step S202, the CPU 711 determines whether the target object is the last object in the object list in FIG. 8. In a case where the CPU 711 determines that the target object is not the last object (NO in step S202), the processing proceeds to step S203. In step S203, the CPU 711 determines whether the selected target object is a dragging target object. In a case where the CPU 711 determines that the target object is a dragging target object (YES in step S203), the target object will not be a snapping point target, so that the processing proceeds to step S207. Then, the CPU 711 selects the next object as a target object from the list in FIG. 8, and the processing returns to step S202.

On the other hand, in a case where the CPU 711 determines that the target object is not a dragging target object (NO in step S203), the processing proceeds to step S204. In step S204, the CPU 711 performs right/left margin extraction processing. The processing performed in step S204 will be described with reference to FIG. 3A. In step S301, the CPU 711 determines whether the distance between the left edge of the current target object and the left edge of the spread page is smaller than the value of the right/left margin stored in the information 501. In a case where the CPU 711 determines that the distance is smaller than the value of the right/left margin stored in the information 501 (YES in step S301), the processing proceeds to step S302. In step S302, the CPU 711 updates the value of the right/left margin stored in the information 501 using the value of the distance between the left edge of the current target object and the left edge of the spread page.

In step S303, the CPU 711 determines whether the distance between the right edge of the current target object and the right edge of the spread page is smaller than the value of the right/left margin stored in the information 501. In a case where the CPU 711 determines that the distance is smaller than the value of the right/left margin stored in the information 501 (YES in step S303), the processing proceeds to step S304. In step S304, the CPU 711 updates the value of the right/left margin stored in the information 501 using the value of the distance between the right edge of the current target object and the right edge of the spread page. In a case where the CPU 711 determines that the distance is not smaller than the value of the right/left margin stored in the information 501 (NO in step S303), the flowchart of FIG. 3A is ended.

Figure 3A:
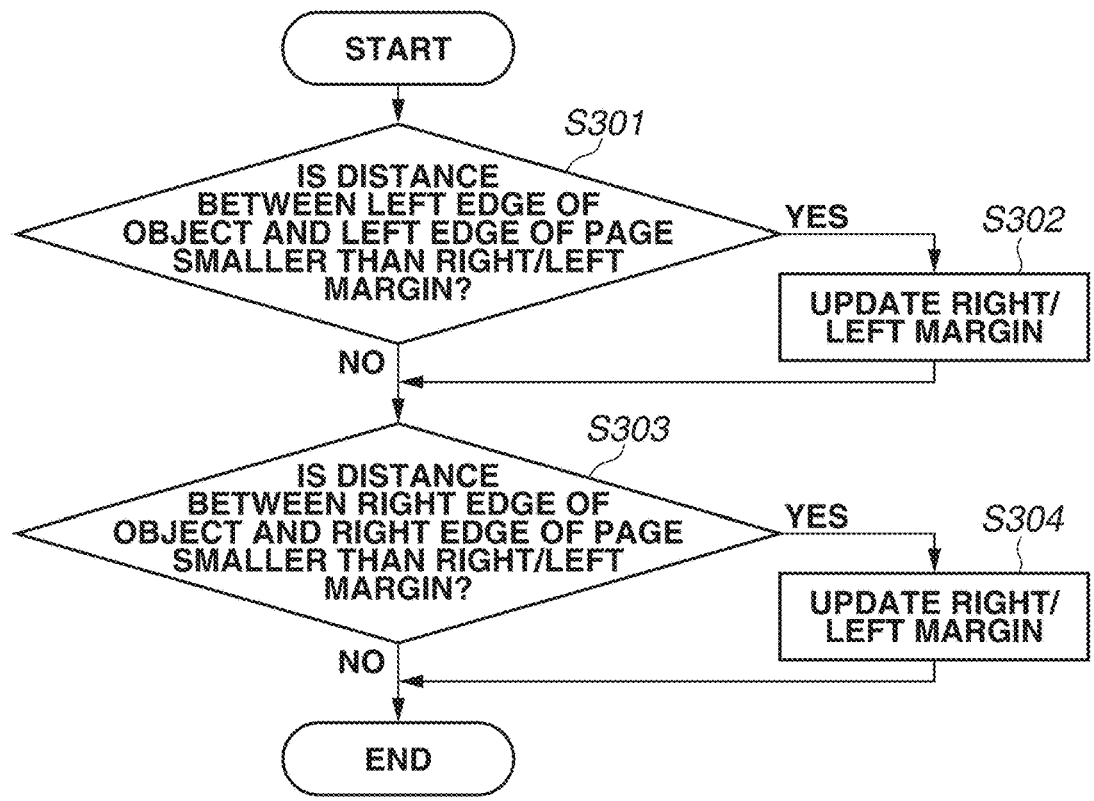
FIGS. 3A and 3B are flowcharts according to the first exemplary embodiment.

If the process in FIG. 3A (i.e., the processing in step S204) is completed, then in step S205, the CPU 711 performs top/bottom margin extraction processing. The processing performed in step S205 will be described with reference to FIG. 3B. In step S305, the CPU 711 determines whether the distance between the top edge of the current target object and the top edge of the spread page is smaller than the value of the top/bottom margin stored in the information 502. In a case where the CPU 711 determines that the distance is smaller than the value of the top/bottom margin stored in the information 502 (YES in step S305), the processing proceeds to step S306. In step S306, the CPU 711 updates the value of the top/bottom margin stored in the information 502 using the value of the distance between the top edge of the current target object and the top edge of the spread page. In a case where the CPU 711 determines that the distance is not smaller than the value of the top/bottom margin stored in the information 502 (NO in step S305), the processing proceeds to step S307.

In step S307, the CPU 711 determines whether the distance between the bottom edge of the current target object and the bottom edge of the spread page is smaller than the value of the top/bottom margin stored in the information 502. In a case where the CPU 711 determines that the distance is smaller than the value of the top/bottom margin stored in the information 502 (YES in step S307), the processing proceeds to step S308. In step S308, the CPU 711 updates the value of the top/bottom margin stored in the information 502 using the value of the distance between the bottom edge of the current target object and the bottom edge of the spread page. In a case where the CPU 711 determines that the distance is not smaller than the value of the top/bottom margin stored in the information 502 (NO in step S307), the flowchart of FIG. 3B is ended.

Figure 3B:
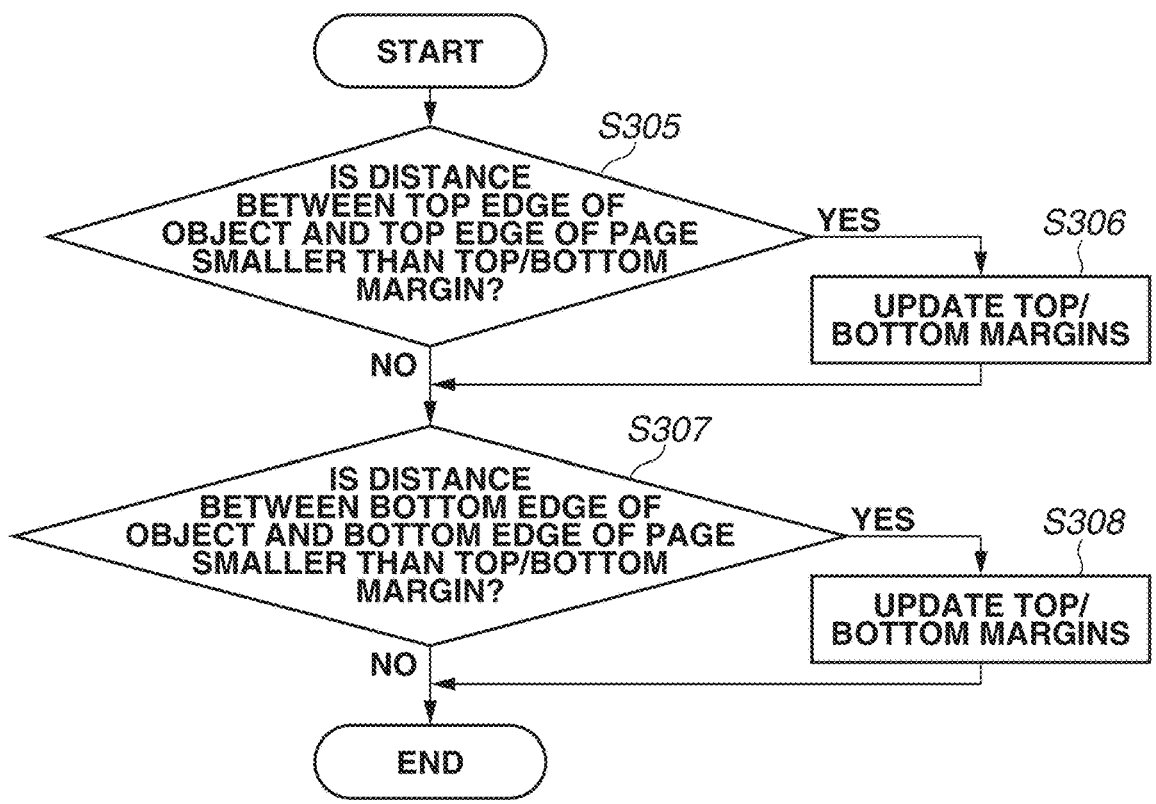

If the process in FIG. 3B (i.e., the processing in step S205) is completed, then in step S206, the CPU 711 performs binding margin extraction processing. The processing performed in step S206 will be described with reference to FIG. 4. In step S401, the CPU 711 determines whether the current target object extends over the binding portion. For example, in a case where the CPU 711 determines that the left, edge of the current target object is on the left side of the binding portion and the right edge of the current target object is on the right side of the binding portion, the CPU 711 determines that the current target object extends over the binding portion (YES in step S401).

In a case where the CPU 711 determines that the current target object extends over the binding portion (YES in step S401), the processing proceeds to step S402. In step S402, the CPU 711 sets the binding margin stored in the information 504 to zero. On the other hand, in a case where the CPU 711 determines that the current target object does not extend over the binding portion (NO in step S401), the processing proceeds to step S403. In step S403, the CPU 711 determines whether the current target object is arranged in a left page area of the spread page. In a case where the CPU 711 determines that the current target object is arranged in the left page area of the spread page (YES in step S403), the processing proceeds to step S404. In step S404, the CPU 711 determines whether the distance between the right edge of the current target object and the binding portion (or the left edge of a spine) is smaller than the value of the binding margin stored in the information 504. The size of the width of the spread page may be set as an initial value of the binding margin stored in the information 504.

Figure 4:
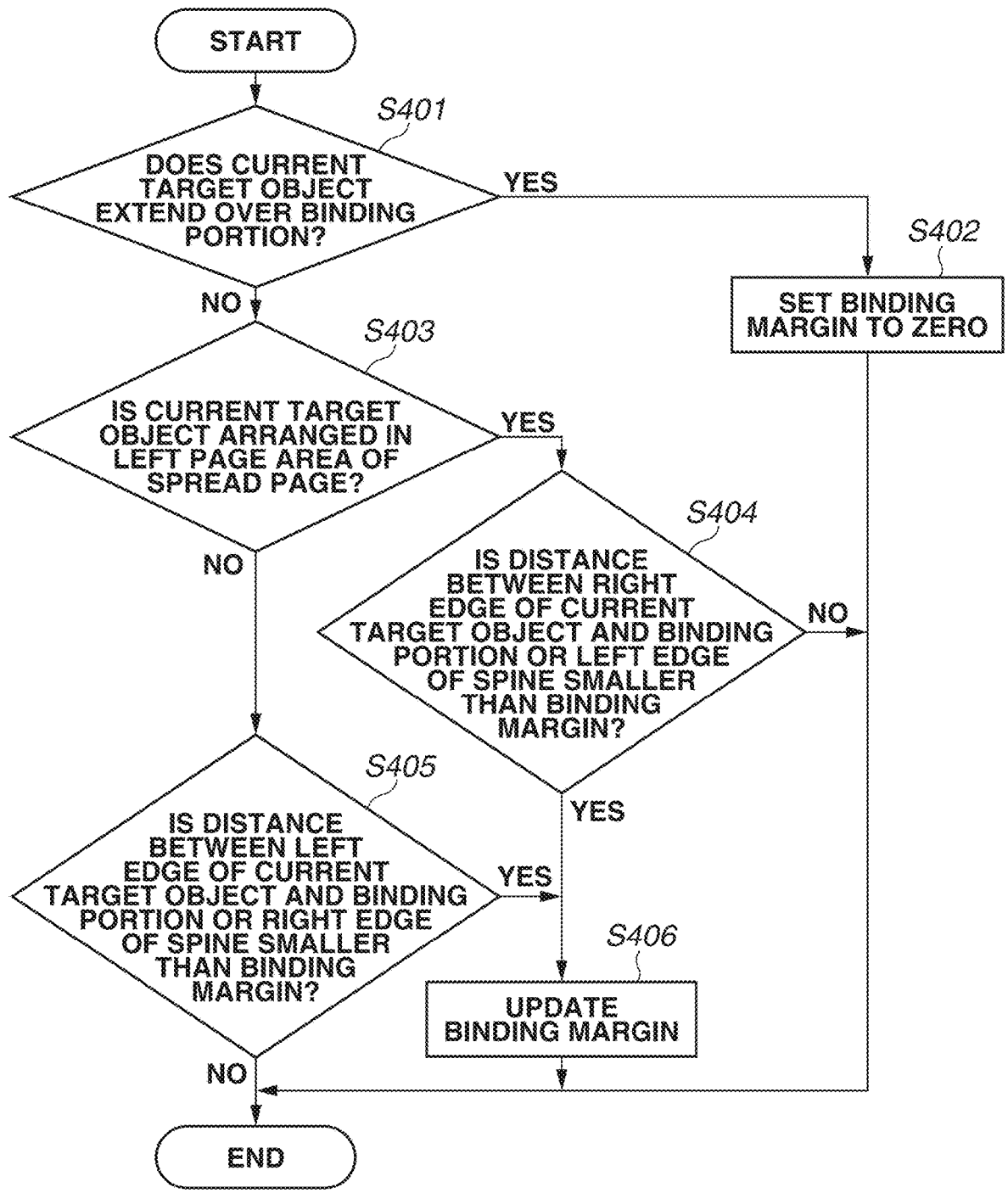
FIG. 4 is a flowchart according to the first exemplary embodiment.

In a case where the CPU 711 determines that the distance is not smaller than the value of the binding margin stored in the information 504 (NO in step S404), the process in FIG. 4 is ended. On the other hand, in a case where the CPU 711 determines that the distance is smaller than the value of the binding margin stored in the information 504 (YES in step S404), the processing proceeds to step S406. In step S406, the CPU 711 sets the distance between the right edge of the current target object and the binding portion (or the left edge of the spine) as the binding margin stored in the information 504.

On the other hand, in a case where the CPU 711 determines that the current target object is not arranged in the left page area of the spread page (NO in step S403), the processing proceeds to step S405. In step S405, the CPU 711 determines whether the distance between the left edge of the current target object and the binding portion (or the right edge of the spine) is smaller than the value of the binding margin stored in the information 504. In a case where the CPU 711 determines that the distance is not smaller than the value of the binding margin stored in the information 504 (NO in step S405), the process in FIG. 4 is ended. On the other hand, in a case where the CPU 711 determines that the distance is smaller than the value of the binding margin stored in the information 504 (YES in step S405), the processing proceeds to step S406. In step S406, the CPU 711 sets the distance between the right edge of the current target object and the binding portion (or the left edge of the spine) as the binding margin stored in the information 504.

The CPU 711 executes step S207 following step S206, and the processing returns to step S202. In a case where the CPU 711 determines that the target object is the last object (YES in step S202), the CPU 711 compares the value of the right/left margin stored in the information 501 and the value of the top/bottom margin stored in the information 502 and sets the smaller one of the values as the minimum margin stored in the information 503.

The values of the margins for generating a snapping point are acquired through the processing up to step S208, so that the values illustrated in FIG. 6 will be set through steps S209 to S215. In steps S209 and S210, the CPU 711 sets the right/left margin stored in the information 501 as the left margin 1 (601) and the top margin 1 (610).

In step S211, the CPU 711 sets the minimum margin stored in the information 503 as the left margin 2 (602) and the top margin 2 (611). In step S212, the CPU 711 sets a value obtained by subtracting the right/left margin stored in the information 501 from the X-coordinate value of the right edge of the spread page as the right margin 1 (608).

In step S213, the CPU 711 sets a value obtained by subtracting the top/bottom margin stored in the information 502 from the Y-coordinate value of the bottom edge of the spread page as the bottom margin 1 (613). In step S214, the CPU 711 sets a value obtained by subtracting the minimum margin stored in the information 503 from the X-coordinate value of the right edge of the spread page as the right margin 2 (609).

In step S215, the CPU 711 sets a value obtained by subtracting the minimum margin stored in the information 503 from the Y-coordinate value of the bottom edge of the spread page as the bottom margin 2 (614).

Next, in step S216, the CPU 711 updates the snapping points of the binding portion and the page center. In a case where the binding margin stored in the information 504 is zero, no snapping is to be performed on the binding portion, so that a value that does not cause the snapping (e.g., a value that indicates the outside of the spread page) is set as the binding margin (left) 603 and the binding margin (right) 607. On the other hand, in a case where the binding margin stored in the information 504 is not zero, the CPU 711 sets the value of the difference between the X-coordinate of the binding portion and the binding margin stored in the information 504 as the binding margin (left) 603 and sets the total value of the X-coordinate of the binding portion and the binding margin stored in the information 504 as the binding margin (right) 607.

Next, the CPU 711 sets a snapping point of the page center. For example, the CPU 711 sets a horizontal center line 1709 of the left page, a horizontal center line 1710 of the right page, and a horizontal center line (binding portion 1704) of the binding portion as illustrated in FIG. 17. Further, the CPU 711 sets a horizontal line 1711 in a vertical direction.

Further, the CPU 711 sets a value obtained by dividing the X-coordinate of the binding portion by two as the left-page center 604 and sets the X-coordinate of the binding portion as a binding position 605. Further, the CPU 711 sets a value obtained by calculating "(page width–X-coordinate of the binding)/2" as the right-page center 606 and sets a value obtained by dividing the page height by two as the page center 612.

An example of a case where object snapping is performed using the values in FIG. 6 that are set through the above-described processing will be described with reference to FIGS. 12A, 12B, 12C, and 12D.

Image data are arranged on a spread page as illustrated in FIG. 12A. In this case, the distance between the left edge of the spread page and the left edge of image data 1201 is set as the left margin 1 (601) and the right margin 1 (608) in FIG. 6. Further, the distance between the top edge of the spread page and the top edge of image data 1202 is set as the top margin 1 (610) and the bottom margin 1 (613) in FIG. 6. The distance between the left edge of the spread page and the left edge of the image data 1201 is smaller than the distance between the top edge of the spread page and the top edge of the image data 1202. Accordingly, the distance between the left edge of the spread page and the left edge of the image data 1201 is set as the left margin 2 (602), the right margin 2 (609), the top margin 2 (611), and the bottom margin 2 (614). Thus, the minimum values of the distances between the objects arranged on the spread page and the edges of the spread page area are determined as snapping points based on the left margin 2 (602), the right margin 2 (609), the top margin 2 (611), and the bottom margin 2 (61A).

In a case where a user drags image data 1203 as illustrated in FIG. 12A, the CPU 711 determines that the distance between the right margin 1 (or the right margin 2) and the right edge of the image data 1203 becomes smaller than a predefined value. Consequently, the CPU 711 performs object snapping as illustrated in FIG. 12B. In this case, the image data 1203 is automatically arranged along a guideline 1205 (i.e., snapping point). At this time, guidelines 1204 and 1205 and an arrow that specifies the distance is displayed.

Further, in a case where a user drags the image data 1203 as illustrated in FIG. 12C, the CPU 711 determines that the distance between the bottom margin 1 and the bottom edge of the image data 1203 becomes smaller than a predefined value. As a result, the CPU 711 performs object snapping as illustrated in FIG. 12D. In this case, the image data 1203 is automatically arranged along a guideline 1206 (i.e., snapping point). At this time, the guidelines 1206 and 1207 and an arrow that specifies the distance is displayed.

Next, an example of a case where object snapping is performed using the binding margin 603 in FIG. 6 will be described with reference to FIGS. 13A and 13B.

Figure 13A:
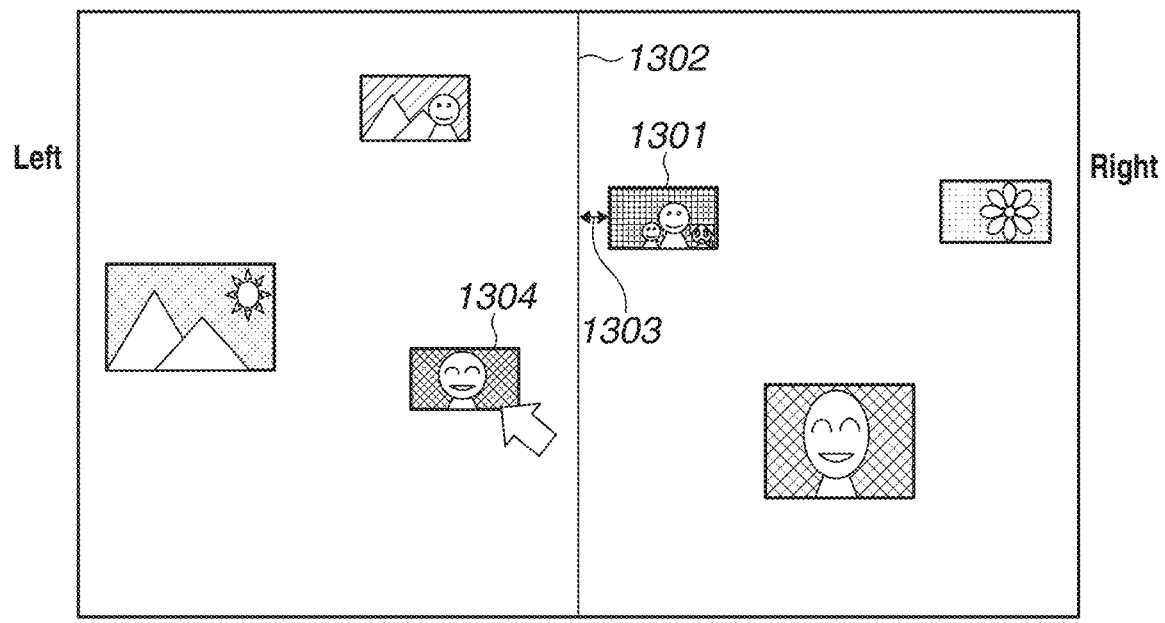
FIGS. 13A and 13B are diagrams each illustrating an example of object snapping.
Figure 13B:
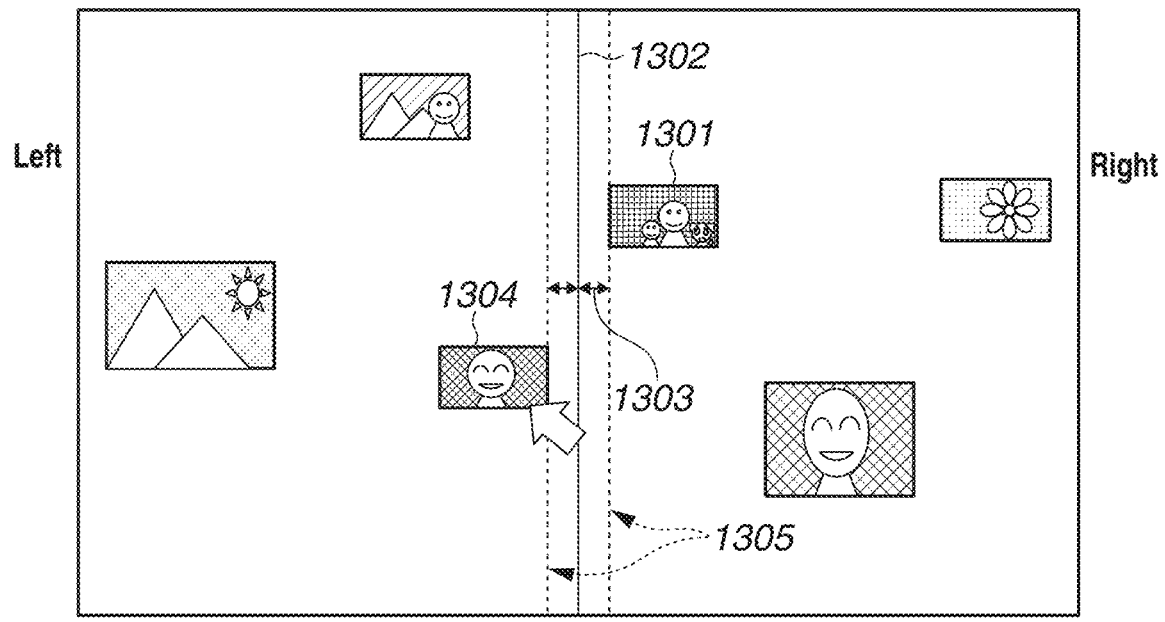

Pieces of Image data are arranged as illustrated in FIG. 13A. Image data 1301 arranged at the closest position to a binding portion 1302, and the distance between the binding portion 1302 and the left edge of the image data 1301 is a distance 1303. Thus, the value of the distance 1303 is set as the binding margin (left) 603 and the binding margin (right) 607. A case where it is determined that the distance between image data 1304 and the binding margin (left) 603 is smaller than a predefined value in a state where a user drags the image data 1304 will be described. In this case, the snapping processing is applied to the image data 1304, and the image data 1304 is arranged as illustrated in FIG. 13B. More specifically, the image data 1304 is automatically arranged along a guideline 1305 (i.e., snapping point). At this time, the guideline 1305 and an arrow used to indicate the distance 1303 are displayed. Through the above-described processing, the user executes a layout in which a binding portion is a center and predetermined margins are maintained with ease.

According to the present exemplary embodiment, a dragging target image object is automatically arranged based on the positional relationship between a spread page and image data arranged on the spread page, so that user-convenience increases.

Next, object snapping performed by using a minimum interval between objects will be described. Description of points that are similar to those according to the first exemplary embodiment is omitted.

In a second exemplary embodiment, the right/left interval stored in the information 505, the top/bottom interval stored in the information 506, and the minimum interval stored in the information 507 in FIG. 5 are used as minimum values of object intervals. These values are set when dragging is started.

Image objects arranged on a spread page are managed as an object list as illustrated in FIG. 8. The CPU 711 checks each or every distance between the objects and extracts the smallest distance to thereby determine the minimum values of the object intervals. There is a case where a distance between objects is calculated based on the positional relationship between the image objects, whereas there is another case where a distance between objects is not calculated based on the positional relationship between the image objects. The cases will be described with reference to FIG. 10. For example, in a case where two image objects that are distance measurement targets are arranged horizontally or vertically as in an arrangement 1001, the CPU 711 calculates the distance between the image objects. On the other hand, an image object in a shaded area with respect to a reference image object A as in an arrangement 1002 is excluded from a target of the calculation of a distance between objects.

Figure 9:
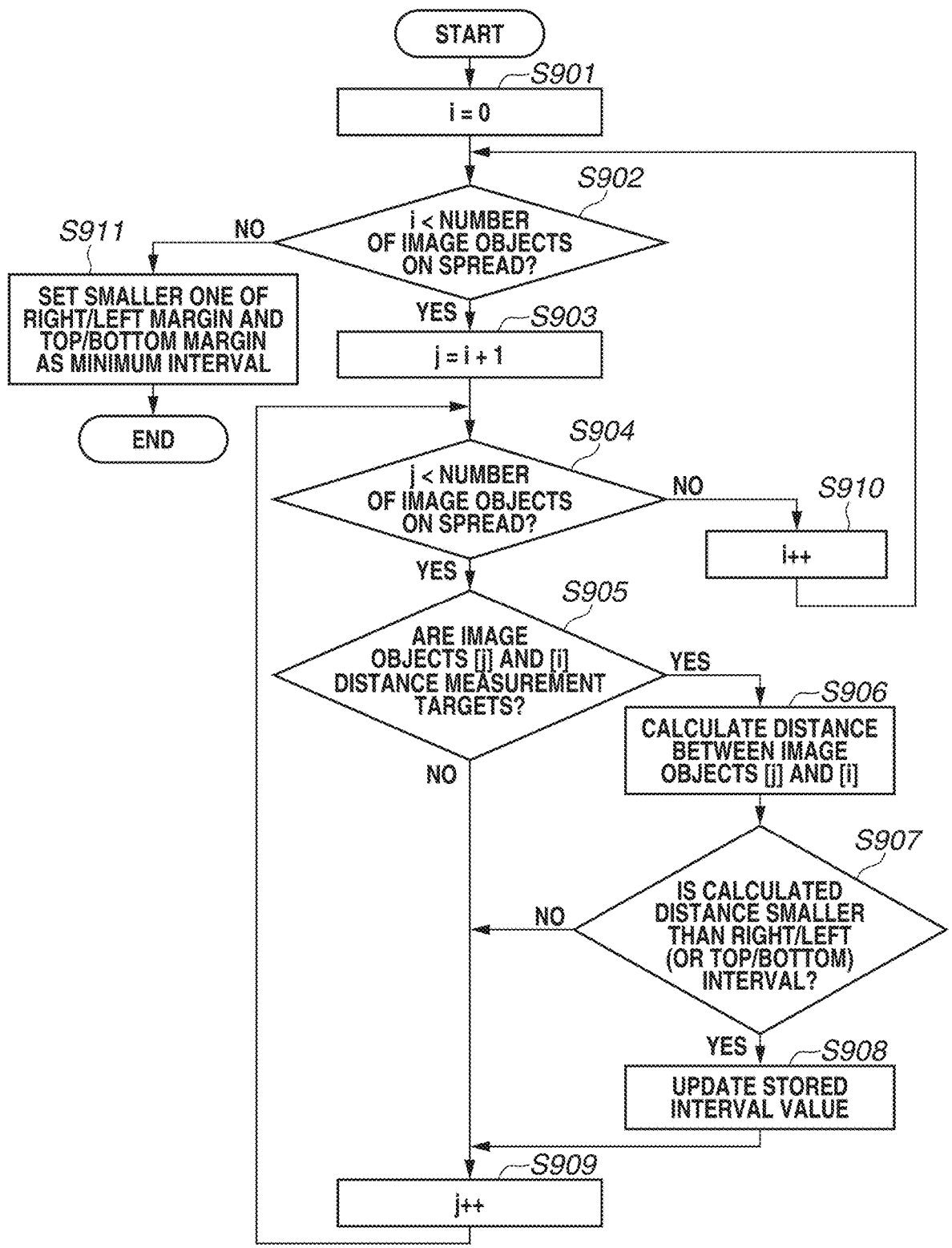
FIG. 9 is a flowchart according to a second exemplary embodiment.
Figure 10:
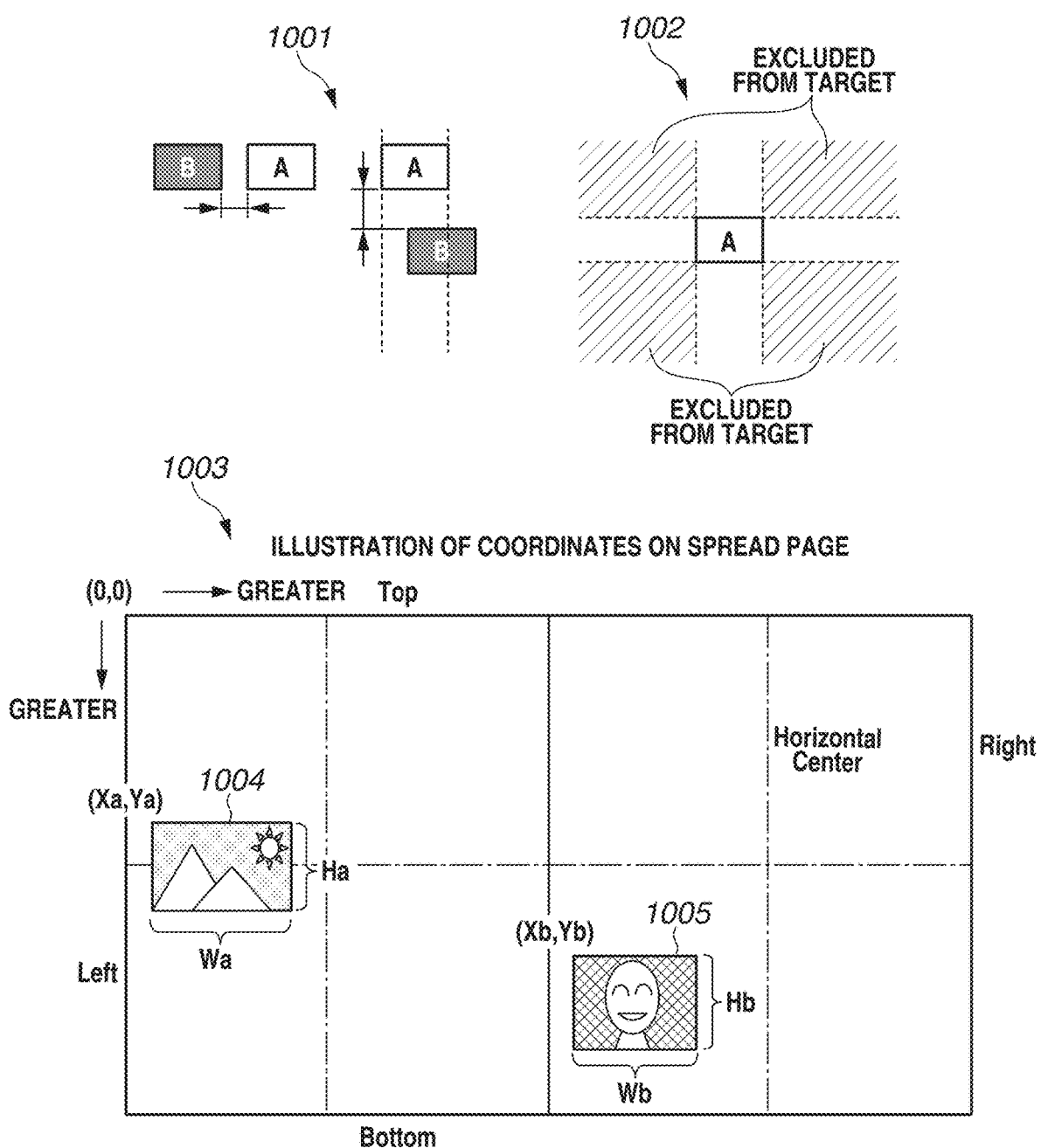
FIG. 10 is a diagram each illustrating an example of a positional relationship between objects.

A process according to the present exemplary embodiment will be described with reference to FIG. 9. A diagram 1003 in FIG. 10 illustrates coordinate values of a spread page. As illustrated in the diagram 1003 in FIG. 10, an upper left point is set as an origin (0, 0). X-coordinate values increase toward the right, whereas Y-coordinate values increase toward the bottom. Further, for example, the coordinates (Xa, Ya) are set as the coordinates of an image object 1004 and the size (Wa, Ha) as the size of the image object 1004.

In step S901, the CPU 711 sets an index i used for scanning the list in FIG. 8 to zero. In step S902, the CPU 711 determines whether the value specified by the index i is smaller than the number of image objects arranged on the spread page. An image object corresponding to the index i will be referred to as "image object (i)". In a case where the CPU 711 determines that the value specified by the index i is smaller than the number of image objects arranged on the spread page (YES in step S902), the processing proceeds to step S903. In step S903, the CPU 711 sets an index j to i+1, and the processing proceeds to step S904. An image object corresponding to the index j will be referred to as "image object (j)".

In step S904, the CPU 711 determines whether the value specified by the index j is smaller than the number of image objects arranged on the spread page. In a case where the CPU 711 determines that the value specified by the index j is not smaller than the number of image objects arranged on the spread page (NO in step S904), the processing proceeds to step S910, In step S910, the CPU 711 increments the index i, and the processing returns to step S902.

On the other hand, in a case where the CPU 711 determines that the value specified by the index j is smaller than the number of image objects arranged on the spread page (YES in step S904), the processing proceeds to step S905. In step S905, the CPU 711 determines whether the image objects (i) and (j) are distance measurement targets. More specifically, the CPU 711 determines the image object A in the arrangement 1002 in FIG. 10 as the image object (i) and determines whether the image object (j) is in the shaded area of the arrangement 1002. In a case where the image object (j) is in the shaded area of the arrangement 1002, the CPU 711 determines that the image objects (i) and (j) are not distance measurement targets (NO in step S905). On the other hand, in a case where the image object (j) is not in the shaded area of the arrangement 1002, the CPU 711 determines that the image objects (i) and (j) are distance measurement targets (YES in step S905).

In a case where the CPU 711 determines that the image objects (i) and (j) are distance measurement targets (YES in step S905), the processing proceeds to step S906. In step S906, the CPU 711 calculates the distance between the image objects (i) and (j). Then, in step S907, the CPU 711 determines whether the distance calculated in step S906 is smaller than the right/left interval stored in the information 505 (or the top/bottom interval stored in the information 506). In a case where the image objects (i) and (j) are arranged horizontally, the right/left interval stored in the information 505 is used, whereas in a case where the image objects (i) and (j) are arranged vertically, the top/bottom interval stored in the information 506 is used.

A case where the CPU 711 determines that the distance calculated in step S906 is smaller than the right/left interval stored in the information 505 (or the top/bottom interval stored in the information 506) (YES in step S907) will be described. In this case, in step S908, the CPU 711 sets the distance calculated in step S906 as the right/left interval in the information 505 (or the top/bottom interval in the information 506), and the processing proceeds to step S909. In a case where the CPU 711 determines that the distance calculated in step S906 is not smaller than the right/left interval stored in the information 505 (or the top/bottom intervale information 506) (NO in step S907), the processing proceeds to step S909. In step S909, the CPU 711 increments j.

In a case where the CPU 711 determines that the value specified by the index i is not smaller than the number of image objects arranged on the spread page (NO in step S902), the processing proceeds to step S911. In step S911, the CPU 711 compares the value of the right/left interval stored in the information 505 and the value of the top/bottom interval stored in the information 506 and sets the smaller one of the values as the minimum interval in the information 507, and the process in FIG. 9 is ended.

Next, object snapping performed by using the minimum interval stored in the information 507 set through the above-described processing will be described. In a case where the CPU 711 determines that the snapping point is not near the current position of the dragging target object (NO in step S105) in FIG. 1, a process illustrated in FIG. 11 is executed between steps S105 and S107.

In step S1101, the CPU 711 initializes the index i to start the determination with the image object at the top of the list in FIG. 8. In step S1102, the CPU 711 determines whether the value of the index i is smaller than the number of image objects arranged on the spread page. An image object corresponding to the index i will be referred to as "image object (i)". In a case where the CPU 711 determines that the value of the index i is not smaller than the number of image objects arranged on the spread page (NO in step S1102), the process in FIG. 11 is ended. On the other hand, in a case where the CPU 711 determines that the value of the index i is smaller than the number of image objects arranged on the spread page (YES in step S1102), the processing proceeds to step S1103. In step S1103, the CPU 711 determines whether the image object (i) is a dragging target object. In a case where the CPU 711 determines that the image object (i) is a dragging target object (YES in step S1103), the processing proceeds to step S1108. In step S1108, the CPU 711 increments the value of the index i, and the processing returns to step S1102.

On the other hand, in a case where the CPU 711 determines that the image object (i) is not a dragging target object (NO in step S1103), the processing proceeds to step S1104. In step S1104, the CPU 711 determines whether the positional relationship between the image object (i) and the object that is being dragged is a distance measurement target position. The determination in step S1104 is similar to the determination in step S905, so that detailed description thereof is omitted. In a case where the CPU 711 determines that the positional relationship between the image object (i) and the dragged object is a distance measurement target position (YES in step S1104), the processing proceeds to step S1105. In step S1105, the CPU 711 calculates the distance between the image object (i) and the object that is being dragged. Then, in step S1106, the CPU 711 calculates the absolute value of the difference between the distance calculated in step S1105 and the minimum interval stored in the information 507 to determine whether the calculated absolute value is smaller than a predefined value. In a case where the absolute value of the difference is not smaller than the predefined value (NO in step S1106), the object is outside the snapping range, so that the processing proceeds to step S1108 in FIG. 11, and the search is continued for the next object. On the other hand, in a case where the absolute value of the difference is smaller than the predefined value (YES in step S1106), the processing proceeds to step S1107.

In step S1107, the CPU 711 performs snapping processing. Details of step S1107 will be described now.

The CPU 711 moves (snaps) the dragging target object based on the positional relationship between the image object (i) and the dragging target object. Details thereof will be described.

First, a case where the image object (i) is arranged on the object that is being dragged in the vertical direction of the spread page will be described. In this case, the CPU 711 moves the dragging target object using the value of "(bottom edge of the image object (i))+(minimum interval)" as the top edge of the dragging target object.

In a case where the image object (i) is arranged under the dragging target object in the vertical direction of the spread page, the CPU 711 moves the dragging target object using the value of "(top edge of the image object (i))−(minimum interval)" as the bottom edge of the dragging target object.

In a case where the image object (i) is arranged on the left side of the dragging target object in the horizontal direction of the spread page, the CPU 711 moves the dragging target object using the value of "(right edge of the image object (i))+(minimum interval)" as the left edge of the dragging target object.

In a case where the image object (i) is arranged on the right side of the dragging target object in the horizontal direction of the spread page, the CPU 711 moves the dragging target object using the value of "(left edge of the image object (i))−(minimum interval)" as the right edge of the dragging target object.

Through the above-described processing, the minimum interval between the objects arranged on the spread page is also applied to the dragging target object that is being dragged.

Figure 14A:
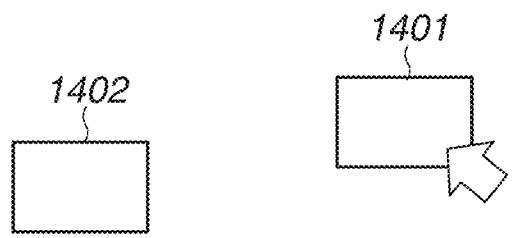
FIGS. 14A, 14B, 14C, and 14D are diagrams each illustrating an example of object snapping.
Figure 14B:
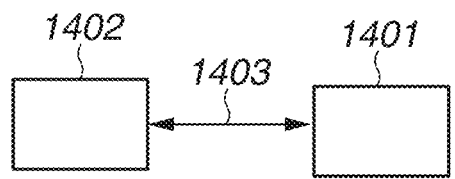

For example, as illustrated in FIG. 14A, image data 1402 is arranged, and image data 1401 is a dragging target object. In this case, the image data 1402 corresponds to the image object (i) in FIG. 11 and is a reference object. In a case where it is determined that the distance between the right edge of the image data 1402 and the left edge of the image data 1401 is smaller than a predefined value based on the minimum interval (a condition for applying the minimum interval is satisfied), object snapping based on the minimum interval is performed. As a result, the image data 1401 and the image data 1402 are arranged with a minimum interval 1403 therebetween as illustrated in FIG. 14B. In other words, the distance between the new object to be arranged and the reference object is the minimum interval 1403.

Figure 14C:
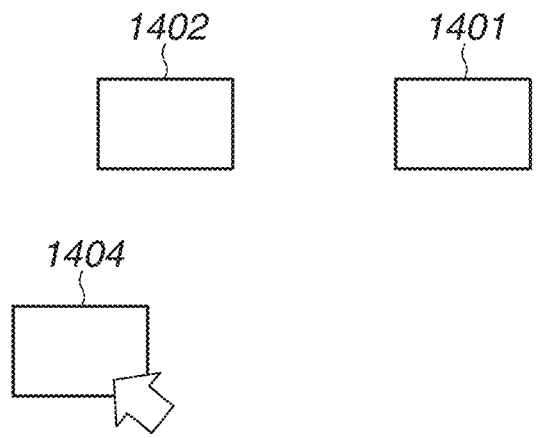
Figure 14D:
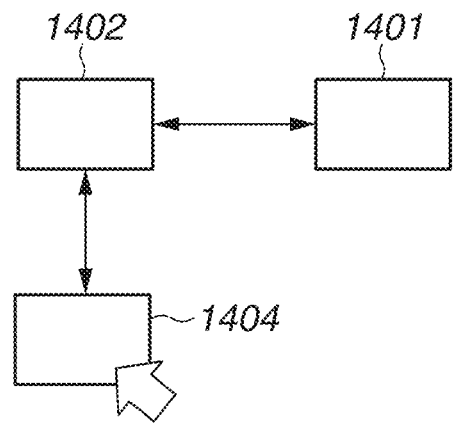

In a case where the user further drags image data 1404 as illustrated in FIG. 14C and it is determined that the distance between the bottom edge of the image data 1402 and the top edge of the image data 1404 is smaller than a predefined value based on the minimum interval, object snapping based on the minimum intervals performed. As a result, the image data 1402 and the image data 1404 are arranged with the minimum interval 1403 therebetween as illustrated in FIG. D.

Figure 15:
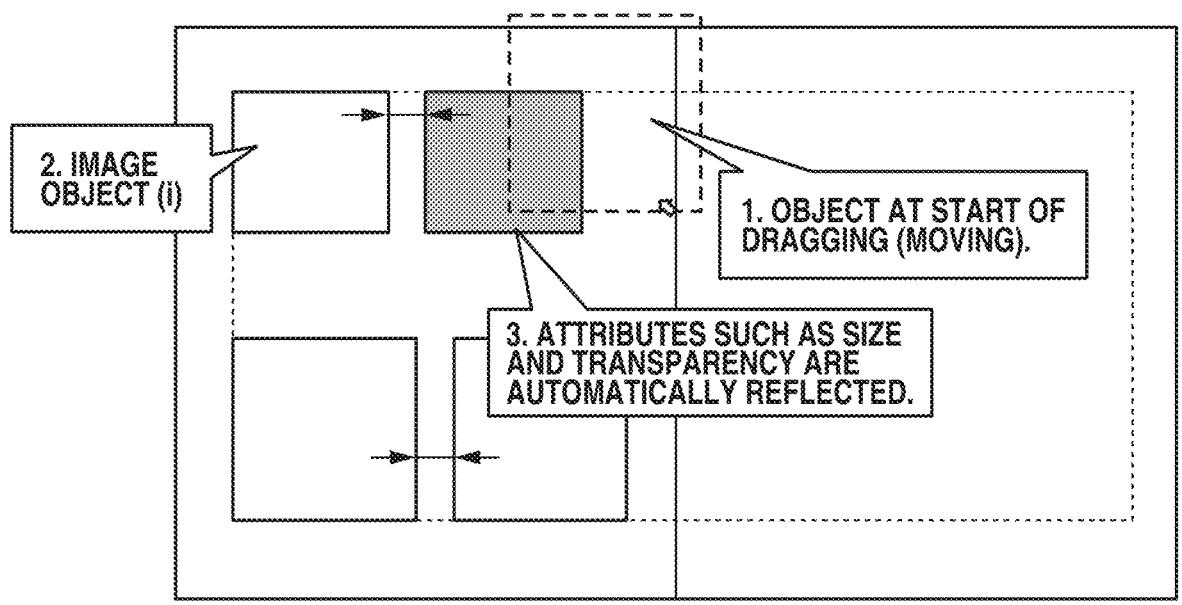
FIG. 15 is a diagram illustrating an example of object snapping.

During the process in FIG. 11, the processing of causing object sizes to be equal can be performed. This will be described with reference to FIG. 15. For example, when performing snapping processing in step S1107, the CPU 711 sets the size of the image object (i) as the size of the object that is being dragged. For example, the size of the dragging target object that is being dragged in FIG. 15 is greater than the size of the image object (i). The CPU 711 acquires the size information 802 about the image object (i) in FIG. 8 and reflects the acquired size information 802 in the size of the dragging target object. As a result, the distance between the image object (i) and the dragging target object is set as the minimum distance, and the size of the image object (i) is reflected in the dragging target object. Alternatively, an attribute other than the size information 802 can be reflected in the dragging target object. For example, at least one of: a transparency 804, a filter effect 805, or a rotation angle (not illustrated) may be reflected in the dragging target object. Examples of filter effects include the processing of converting entire image data into a sepia color, the processing of converting image data into black and white, and blur processing.

The album editing application 712 can be configured to include all the functions according to the first and second exemplary embodiments described above.

Further, while the processing is executed using the album editing application 712 in the above-described exemplary embodiments, it is not limited thereto. For example, the processing according to the above-described exemplary embodiments may be executed using a layout editing application that arranges new object data. Further, an object to be arranged is not limited to image data. The above-described exemplary embodiments are also applicable to an arrangement of other data such as stamp data.

According to the present disclosure, a layout with unity can be implemented through a simple operation.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-146640, filed Aug. 8, 2019, which is hereby incorporated by reference herein in its entirety.

What is claimed is:

1. An information processing apparatus to execute object snapping, the information processing apparatus comprising: at least one processor causing the information processing apparatus to perform operations including:

displaying a spread page having a first object and a second object previously arranged on the spread page, and having a left edge, a right edge which is horizontally opposite to the left edge, a bottom edge, and a top edge which is vertically opposite to the bottom edge, specifying, in response to the first object being located closer to the left edge than the right edge and the second object being located closer to the bottom edge than the top edge and being located lower and right relative to the first object, a first distance and a second distance, wherein the first distance is in a horizontal direction between the left edge and the first object and the second distance is different from the first distance and is in a vertical direction between the bottom edge and the second object, determining a first snapping point and a third snapping point different from the first snapping point based on the first distance, and a second snapping point and a fourth snapping point different from the second snapping point based on the second distance, and executing the object snapping to determine a position at which to automatically move and arrange a third object on the spread page based on positions of the previously arranged first and second objects as follows:

wherein, in response to the third object being moved inward from the left edge to within a first predetermined range from the first snapping point at the first distance, executing includes executing the object snapping to move and arrange the third object on the spread page based on the first snapping point, wherein, in response to the third object being moved inward from the right edge to within a third predetermined range from the third snapping point at the first distance, executing includes executing the object snapping to move and arrange the third object on the spread page based on the third snapping point, wherein, in response to the third object being moved inward from the bottom edge to within a second predetermined range from the second snapping point at the second distance, executing includes executing the object snapping to move and arrange the third object on the spread page based on the second snapping point, wherein, in response to the third object being moved inward from the top edge to within a fourth predetermined range from the fourth snapping point at the second distance, executing includes executing the object snapping to move and arrange the third object on the spread page based on the fourth snapping point, wherein determining includes determining a minimum interval between plural arranged objects prearranged on the spread page, wherein, in response to a distance between a reference object among the plural arranged objects and the third object satisfying a condition for applying the minimum interval, executing includes executing the object snapping so that an interval between the third object and the reference object becomes the minimum interval and an attribute of the reference object is visually reflected in the third object, and wherein the attribute of the reference object is at least one of a size, a transparency, a filter effect, and a rotation angle.

2. The information processing apparatus according to claim 1, wherein the spread page has a spread page area, and wherein, in response to the second object being arranged on the spread page area and not extending over a binding portion of the spread page area, determining includes determining a snapping point based on the second object using a distance between the second object arranged on the spread page area and the binding portion of the spread page area.

3. The information processing apparatus according to claim 1, wherein, in response to the distance between the reference object and the third object satisfying the condition for applying the minimum interval, executing includes executing the object snapping so that the interval between the third object and the reference object becomes the minimum interval, and an attribute of the reference object is visually reflected in the third object.

4. The information processing apparatus according to claim 1, wherein executing the object snapping includes displaying a guideline specifying a snapping point.

5. The information processing apparatus according to claim 1, wherein the operations further include instructing generating of an album using a layout acquired by executing the object snapping.

6. The information processing apparatus according to claim 1, wherein the spread page includes a first page separated from a second page by a spine center, and the first snapping point is on the first page of the spread page and the third snapping point is on the second page of the spread page.

7. The information processing apparatus according to claim 6, wherein the third snapping point is at a distance from the right edge that is equal to the distance at which the first snapping point is from the left edge.

8. A method for an information processing apparatus to execute object snapping, the method comprising:
displaying a spread page having a first object and a second object previously arranged on the spread page, and having a left edge, a right edge which is horizontally opposite to the left edge, a bottom edge, and a top edge which is vertically opposite to the bottom edge;
specifying, in response to the first object being located closer to the left edge than the right edge and the second object being located closer to the bottom edge than the top edge and being located lower and right relative to the first object, a first distance and a second distance, wherein the first distance is in a horizontal direction between the left edge and the first object and the second distance is different from the first distance and is in a vertical direction between the bottom edge and the second object;
determining a first snapping point and a third snapping point different from the first snapping point based on the first distance, and a second snapping point and a fourth snapping point different from the second snapping point based on the second distance; and
executing the object snapping to determine a position at which to automatically move and arrange a third object on the spread page based on positions of the previously arranged first and second objects as follows:
wherein, in response to the third object being moved inward from the left edge to within a first predetermined range from the first snapping point at the first distance, executing includes executing the object snapping to move and arrange the third object on the spread page based on the first snapping point,
wherein, in response to the third object being moved inward from the right edge to within a third predetermined range from the third snapping point at the first distance, executing includes executing the object snapping to move and arrange the third object on the spread page based on the third snapping point,
wherein, in response to the third object being moved inward from the bottom edge to within a second predetermined range from the second snapping point at the second distance, executing includes executing the object snapping to move and arrange the third object on the spread page based on the second snapping point,
wherein, in response to the third object being moved inward from the top edge to within a fourth predetermined range from the fourth snapping point at the second distance, executing includes executing the object snapping to move and arrange the third object on the spread page based on the fourth snapping point,
wherein determining includes determining a minimum interval between plural arranged objects prearranged on the spread page,
wherein, in response to a distance between a reference object among the plural arranged objects and the third object satisfying a condition for applying the minimum interval, executing includes executing the object snapping so that an interval between the third object and the reference object becomes the minimum interval and an attribute of the reference object is visually reflected in the third object, and
wherein the attribute of the reference object is at least one of a size, a transparency, a filter effect, and a rotation angle.

9. The method according to claim 8,
wherein the spread page has a spread page area, and
wherein, in response to the second object being arranged on the spread page area and not extending over a binding portion of the spread page area, determining includes determining a snapping point based on the second object using a distance between the second object arranged on the spread page area and the binding portion of the spread page area.

10. The method according to claim 8, wherein, in response to the distance between the reference object and the third object satisfying the condition for applying the minimum interval, executing includes executing the object snapping so that the interval between the third object and the reference object becomes the minimum interval, and an attribute of the reference object is visually reflected in the third object.

11. The method according to claim 8, wherein executing the object snapping includes displaying a guideline specifying a snapping point.

12. A non-transitory computer-readable storage medium storing a program to cause a computer to perform a method for an information processing apparatus to execute object snapping, the method comprising:
displaying a spread page having a first object and a second object previously arranged on the spread page, and having a left edge, a right edge which is horizontally opposite to the left edge, a bottom edge, and a top edge which is vertically opposite to the bottom edge;
specifying, in response to the first object being located closer to the left edge than the right edge and the second object being located closer to the bottom edge than the top edge and being located lower and right relative to the first object, a first distance and a second distance, wherein the first distance is in a horizontal direction between the left edge and the first object and the second distance is different from the first distance and is in a vertical direction between the bottom edge and the second object;

determining a first snapping point and a third snapping point different from the first snapping point based on the first distance, and a second snapping point and a fourth snapping point different from the second snapping point based on the second distance; and executing the object snapping to determine a position at which to automatically move and arrange a third object on the spread page based on positions of the previously arranged first and second objects as follows:

wherein, in response to the third object being moved inward from the left edge to within a first predetermined range from the first snapping point at the first distance, executing includes executing the object snapping to move and arrange the third object on the spread page based on the first snapping point, wherein, in response to the third object being moved inward from the right edge to within a third predetermined range from the third snapping point at the first distance, executing includes executing the object snapping to move and arrange the third object on the spread page based on the third snapping point, wherein, in response to the third object being moved inward from the bottom edge to within a second predetermined range from the second snapping point at the second distance, executing includes executing the object snapping to move and arrange the third object on the spread page based on the second snapping point, wherein, in response to the third object being moved inward from the top edge to within a fourth predetermined range from the fourth snapping point at the second distance, executing includes executing the object snapping to move and arrange the third object on the spread page based on the fourth snapping point, wherein determining includes determining a minimum interval between plural arranged objects prearranged on the spread page, wherein, in response to a distance between a reference object among the plural arranged objects and the third object satisfying a condition for applying the minimum interval, executing includes executing the object snapping so that an interval between the third object and the reference object becomes the minimum interval and an attribute of the reference object is visually reflected in the third object, and wherein the attribute of the reference object is at least one of a size, a transparency, a filter effect, and a rotation angle.

13. The non-transitory computer-readable storage medium according to claim 12, wherein the spread page has a spread page area, and wherein, in response to the second object being arranged on the spread page area and does not extend over a binding portion of the spread page area, determining includes determining a snapping point based on the second object using a distance between the second object arranged on the spread page area and the binding portion of the spread page area.

14. The non-transitory computer-readable storage medium according to claim 12, wherein executing the object snapping includes displaying a guideline specifying a snapping point.

\* \* \* \* \*